US011523657B2

(12) United States Patent
Bailly et al.

(10) Patent No.: US 11,523,657 B2
(45) Date of Patent: Dec. 13, 2022

(54) FOOT SUPPORT SYSTEMS INCLUDING FLUID MOVEMENT CONTROLLERS

(71) Applicant: NIKE, Inc., Beaverton, OR (US)

(72) Inventors: Devin Bailly, Beaverton, OR (US); Levi J. Patton, Portland, OR (US); Adam Vollmer, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 287 days.

(21) Appl. No.: 16/878,342

(22) Filed: May 19, 2020

(65) Prior Publication Data

US 2020/0367606 A1 Nov. 26, 2020

Related U.S. Application Data

(60) Provisional application No. 62/850,140, filed on May 20, 2019.

(51) Int. Cl.
*A43B 13/20* (2006.01)
*F16K 31/524* (2006.01)

(52) U.S. Cl.
CPC ...... *A43B 13/203* (2013.01); *F16K 31/52416* (2013.01)

(58) Field of Classification Search
CPC ...... F16K 11/16; F16K 11/161; F16K 11/163; F16K 11/166; F16K 31/52416; A43B 13/20; A43B 13/203; A43B 13/206
See application file for complete search history.

(56) References Cited

U.S. PATENT DOCUMENTS

| | | | |
|---|---|---|---|
| 2,539,221 A | 1/1951 | Badeaux | |
| 2,769,459 A | 11/1956 | Birkness et al. | |
| 2002/0035794 A1* | 3/2002 | Doyle | A43B 13/203 36/28 |
| 2007/0262278 A1* | 11/2007 | Fox | F16K 31/52416 251/129.09 |
| 2015/0041006 A1* | 2/2015 | Morishita | F16K 11/0716 137/625.11 |
| 2016/0091109 A1* | 3/2016 | Woods | F16K 11/166 137/224 |
| 2018/0008005 A1 | 1/2018 | Compton et al. | |
| 2020/0170343 A1* | 6/2020 | Bailly | A43B 13/206 |
| 2021/0207728 A1* | 7/2021 | Alali | F16K 11/22 |

OTHER PUBLICATIONS

Jul. 23, 2020—(WO) ISR—App. No. PCT/US20/180259.

* cited by examiner

*Primary Examiner* — Hailey K. Do
(74) *Attorney, Agent, or Firm* — Banner & Witcoff, Ltd.

(57) ABSTRACT

Foot support systems include a fluid flow control system that facilitates movement of fluid into, out of, and/or within a sole structure and/or article of footwear, e.g., to change and/or control pressure in fluid filled bladder(s). The fluid flow control system includes: (a) a manifold body defining an internal chamber; (b) at least a first port in fluid communication with the internal chamber; (c) at least a first valve (including a first valve activator) controlling fluid flow through the first port; and (d) a movable cam at least partially within the internal chamber. Valve activator surface(s) on the cam interact with the valve activator(s) to selectively open and close valve(s) based on cam positioning.

22 Claims, 14 Drawing Sheets

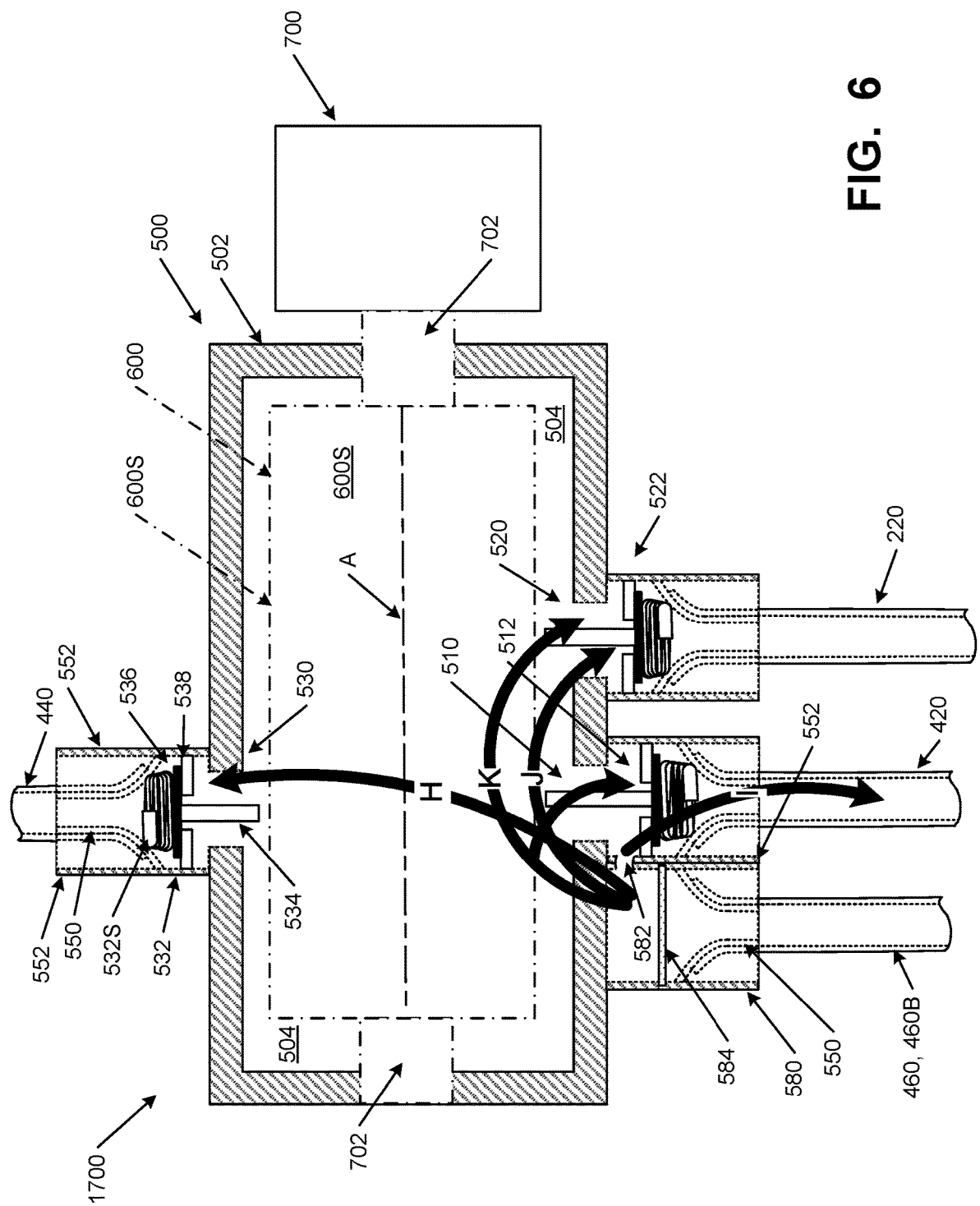

US 11,523,657 B2

FOOT SUPPORT SYSTEMS INCLUDING FLUID MOVEMENT CONTROLLERS

RELATED APPLICATION DATA

This application is a U.S. Non-Provisional Application and claims priority benefits based on U.S. Provisional Patent Appln. No. 62/850,140 filed May 20, 2019. U.S. Provisional Patent Appln. No. 62/850,140 is entirely incorporated herein by reference.

Aspects and features of this technology may be used in conjunction with the systems and methods described in: (a) U.S. Provisional Patent Appln. No. 62/463,859 filed Feb. 27, 2017; (b) U.S. Provisional Patent Appln. No. 62/463,892 filed Feb. 27, 2017; (c) U.S. Provisional Patent Appln. No. 62/547,941 filed Aug. 21, 2017; (d) U.S. Provisional Patent Appln. No. 62/678,635 filed May 31, 2018; (e) U.S. Provisional Patent Appln. No. 62/678,662 filed May 31, 2018; (f) U.S. Provisional Patent Appln. No. 62/772,786 filed Nov. 29, 2018; and (g) U.S. patent application Ser. No. 16/698,138 filed Nov. 27, 2019. Each of U.S. Provisional Patent Appln. No. 62/463,859, U.S. Provisional Patent Appln. No. 62/463,892, U.S. Provisional Patent Appln. No. 62/547,941, U.S. Provisional Patent Appln. No. 62/678,635, U.S. Provisional Patent Appln. No. 62/678,662, U.S. Provisional Patent Appln. No. 62/772,786, and U.S. patent application Ser. No. 16/698,138 is entirely incorporated herein by reference.

FIELD OF THE INVENTION

The present invention relates to fluid flow control systems and/or foot support systems in the field of footwear or other foot-receiving devices. At least some aspects of the present invention pertain to sole structures, fluid flow control systems, foot support systems, articles of footwear, and/or other foot-receiving devices that include a fluid flow control system (e.g., a manifold, a cam activated manifold, an electronic controller, etc.) to selectively move fluid within, into, and/or out of the sole structure and/or article of footwear, e.g., to change and/or control pressure (e.g., foot support pressure) in one or more fluid filled bladders (e.g., foot support bladder(s)) and/or one or more fluid reservoirs and/or containers included in the overall system.

BACKGROUND

Conventional articles of athletic footwear include two primary elements, an upper and a sole structure. The upper may provide a covering for the foot that securely receives and positions the foot with respect to the sole structure. In addition, the upper may have a configuration that protects the foot and provides ventilation, thereby cooling the foot and removing perspiration. The sole structure may be secured to a lower surface of the upper and generally is positioned between the foot and any contact surface. In addition to attenuating ground reaction forces and absorbing energy, the sole structure may provide traction and control potentially harmful foot motion, such as over pronation.

The upper forms a void on the interior of the footwear for receiving the foot. The void has the general shape of the foot, and access to the void is provided at an ankle opening. Accordingly, the upper extends over the instep and toe areas of the foot, along the medial and lateral sides of the foot, and around the heel area of the foot. A lacing system often is incorporated into the upper to allow users to selectively change the size of the ankle opening and to permit the user to modify certain dimensions of the upper, particularly girth, to accommodate feet with varying proportions. In addition, the upper may include a tongue that extends under the lacing system to enhance the comfort of the footwear (e.g., to modulate pressure applied to the foot by the laces), and the upper also may include a heel counter to limit or control movement of the heel.

"Footwear," as that term is used herein, means any type of wearing apparel for the feet, and this term includes, but is not limited to: all types of shoes, boots, sneakers, sandals, thongs, flip-flops, mules, scuffs, slippers, sport-specific shoes (such as golf shoes, tennis shoes, baseball cleats, soccer or football cleats, ski boots, basketball shoes, cross training shoes, etc.), and the like. "Foot-receiving device," as that term is used herein, means any device into which a user places at least some portion of his or her foot. In addition to all types of "footwear," foot-receiving devices include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like. "Foot-receiving devices" may include one or more "foot-covering members" (e.g., akin to footwear upper components), which help position the foot with respect to other components or structures, and one or more "foot-supporting members" (e.g., akin to footwear sole structure components), which support at least some portion(s) of a plantar surface of a user's foot. "Foot-supporting members" may include components for and/or functioning as midsoles and/or outsoles for articles of footwear (or components providing corresponding functions in non-footwear type foot-receiving devices).

The terms "circumference" or "circumferential" or variations thereof as used herein corresponds to any shaped exterior boundary or surface (e.g., an object having any cross sectional and/or perimeter shape). These terms should not be construed as limited to objects having circular perimeters and/or circular cross sectional shapes unless the modifier "circular" is specifically used with the term (e.g., "circular circumference").

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

FIGS. 4-6 provide views of fluid flow control systems and various component parts thereof, including various example operational states for such fluid flow control systems, in accordance with some examples of this technology.

DETAILED DESCRIPTION

Figure 1A:
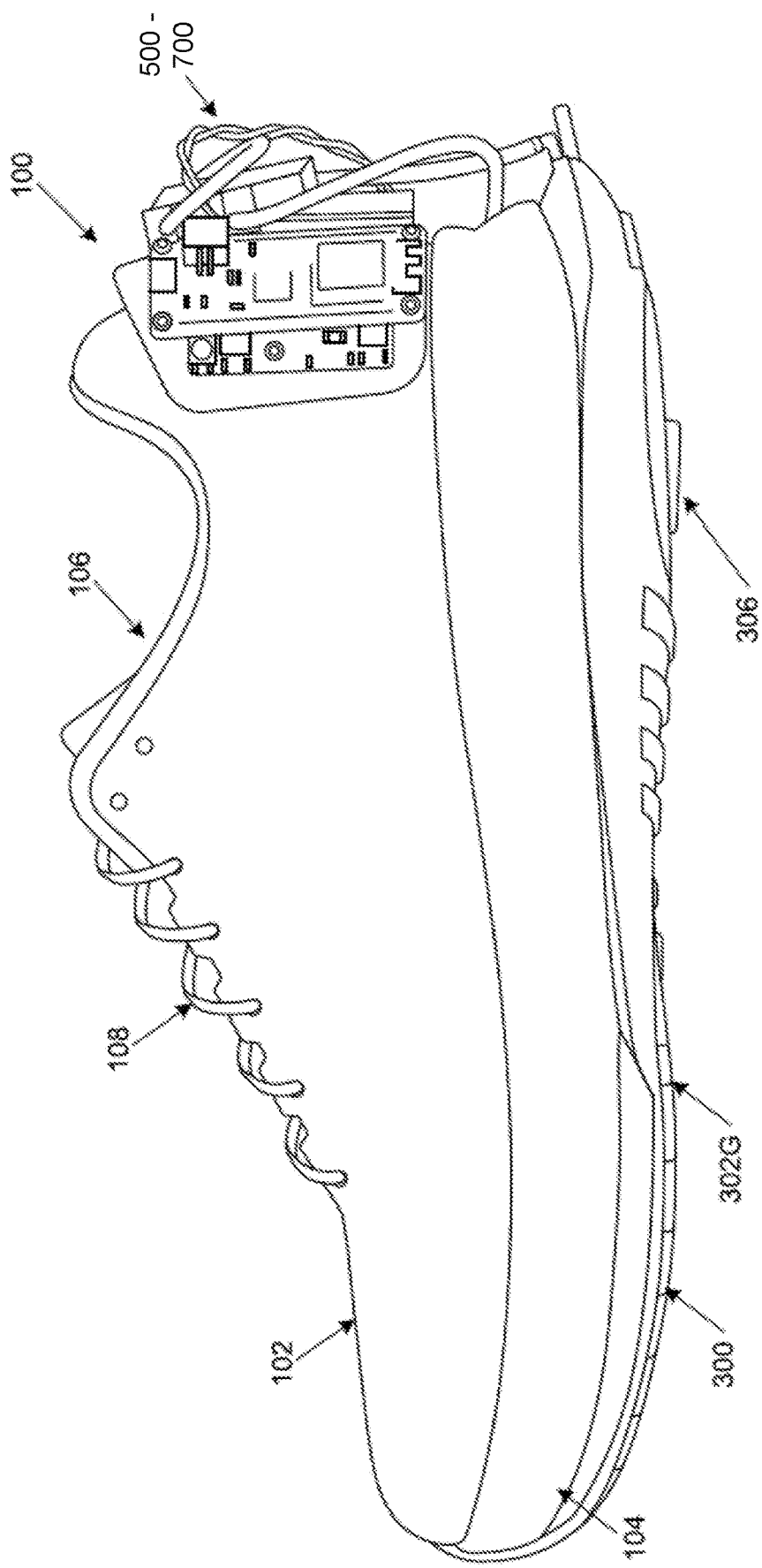
FIGS. 1A-1C provide various views of articles of footwear including fluid flow control systems and foot support systems in accordance with some examples of this technology.

In the following description of various examples of footwear structures and components according to the present technology, reference is made to the accompanying drawings, which form a part hereof, and in which are shown by way of illustration various example structures and environments in which aspects of the technology may be practiced. It is to be understood that other structures and environments may be utilized and that structural and functional modifications may be made to the specifically described structures, functions, and methods without departing from the scope of the present technology.

I. General Description of Aspects of this Technology

Aspects of this technology relate to fluid flow control systems, foot support systems, articles of footwear, and/or other foot-receiving devices, e.g., of the types described and/or claimed below and/or of the types illustrated in the appended drawings. Such fluid flow control systems, foot support systems, articles of footwear, and/or other foot-receiving devices may include any one or more structures, parts, features, properties, and/or combination(s) of structures, parts, features, and/or properties of the examples described and/or claimed below and/or of the examples illustrated in the appended drawings.

Some aspects of this technology relate to fluid flow control systems for articles of footwear and/or other foot-receiving devices that include: (a) a manifold body defining an internal chamber; (b) a first port in fluid communication with the internal chamber; (c) a first valve controlling fluid flow through the first port, wherein the first valve includes a first valve activator; and (d) a movable cam at least partially located within the internal chamber, wherein the movable cam includes one or more first valve activator surfaces that interact with the first valve activator to change the first valve between a closed configuration and an open configuration. Some such fluid flow control systems further may include: (a) a second port in fluid communication with the internal chamber; and (b) a second valve controlling fluid flow through the second port, wherein the second valve includes a second valve activator, wherein the movable cam further includes one or more second valve activator surfaces that interact with the second valve activator to change the second valve between a closed configuration and an open configuration. A fluid flow control system may include one or more additional ports, valves, valve activators, and/or valve activator surfaces, if desired. Such fluid flow control systems may be incorporated into a footwear foot support system (e.g., a sole structure and/or article of footwear) that includes a foot support bladder and a fluid source container, wherein the movable cam selectively opens and closes the valve(s) to move fluid between the foot support bladder and the fluid source.

Some aspects or examples of this technology relate to fluid flow control systems for articles of footwear that include: (a) a manifold body defining an internal chamber; (b) a first port in fluid communication with the internal chamber; (c) a second port in fluid communication with the internal chamber; (d) a third port in fluid communication with the internal chamber; (e) a first valve controlling fluid flow through the first port, wherein the first valve includes a first valve activator; (f) a second valve controlling fluid flow through the second port, wherein the second valve includes a second valve activator; (g) a third valve controlling fluid flow through the third port, wherein the third valve includes a third valve activator; and (h) a movable cam at least partially located within the internal chamber. The movable cam may include: (a) one or more first valve activator surfaces that interact with the first valve activator to change the first valve between a closed configuration and an open configuration when the movable cam is moved, (b) one or more second valve activator surfaces that interact with the second valve activator to change the second valve between a closed configuration and an open configuration when the movable cam is moved, and (c) one or more third valve activator surfaces that interact with the third valve activator to change the third valve between a closed configuration and an open configuration when the movable cam is moved. The valves may be biased to a closed position when no force is applied to the valve activators by an activator surface of the movable cam.

The fluid flow control systems may take on various fluid flow configurations, e.g., to selectively move fluid to and/or between the various ports (and/or to selectively move fluid to and/or between the various components to which those ports are connected) based on the position of the movable cam with respect to the various valve activator(s). Depending on the cam position, fluid may or may not move through the manifold body in various different directions or ways.

At any given moment, movable cams in accordance with at least some aspects and examples of this technology may be placed in a specific position with respect to the valve activator(s). As one specific example, a movable cam may include activator surface(s) to interact with the valve activator(s) to place the fluid flow system into one or more (and optionally all) of the following configurations:

(A) in at least one position of the movable cam, the one or more first valve activator surfaces, the one or more second valve activator surfaces, and the one or more third valve activator surfaces are longitudinally and circumferentially spaced with respect to one another and with respect to the valve activators such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration; optionally, in this configuration, fluid will not flow through the manifold body;

(B) in at least one position of the movable cam, the one or more first valve activator surfaces, the one or more second valve activator surfaces, and the one or more third valve activator surfaces are longitudinally and circumferentially spaced with respect to one another and with respect to the valve activators such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration; optionally, in this configuration, fluid may flow into and/or out of the manifold body through the third port and/or valve (e.g., to equalize pressure in the manifold with the external environment);

(C) in at least one position of the movable cam, the one or more first valve activator surfaces, the one or more second valve activator surfaces, and the one or more third valve activator surfaces are longitudinally and circumferentially spaced with respect to one another and with respect to the valve activators such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration; optionally, in this configuration, fluid may flow through the manifold body from the second port and/or valve to the third port and/or valve or vice versa;

(D) in at least one position of the movable cam, the one or more first valve activator surfaces, the one or more second valve activator surfaces, and the one or more third valve activator surfaces are longitudinally and circumferentially spaced with respect to one another and with respect to the valve activators such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration; optionally, in this configuration, fluid may flow through the manifold body from the first port and/or valve to the second port and/or valve or vice versa; and/or (E) in at least one position of the movable cam, the one or more first valve activator surfaces, the one or more second valve activator surfaces, and the one or more third valve activator surfaces are longitudinally and circumferentially spaced with respect to one another and with respect to the valve activators such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) at least one or more of the one or more third valve activator surfaces interacts with the third valve activator to thereby place the third valve in the open configuration; optionally, in this configuration, fluid may flow freely through the manifold body and the first port and/or valve, second port and/or valve, and third port and/or valve, e.g., to equalize pressure in the overall fluid flow system.

A motor may be operatively coupled with the movable cam to move the movable cam to selectively place the one or more first valve activator surfaces, the one or more second valve activator surfaces, and the one or more third valve activator surfaces (and optionally any other valve activator surfaces that may be present) in a plurality of different positions with respect to the internal chamber of the manifold body, the valves, the valve activators, and/or the ports. The motor may slide and/or rotate the movable cam with respect to the valve(s), valve activator(s), port(s), and/or the internal chamber of the manifold body to place the movable cam in a plurality of different positions with respect to the valve(s), valve activator(s), port(s), and/or the internal chamber of the manifold body.

In at least some examples of this technology, the fluid flow control system further may include a fourth port in fluid communication with the internal chamber. This fourth port may include a fourth valve controlling fluid flow through the fourth port. Also, in some examples of this aspect of the technology, this fourth valve may include a fourth valve activator, and the movable cam further may include one or more fourth valve activator surfaces that interact with the fourth valve activator to change the fourth valve between a closed configuration and an open configuration when the movable cam is moved. Additionally or alternatively, the fourth port may be in fluid communication with one or more of the other ports (e.g., the first port), e.g., at the manifold internal chamber side of the valve seating surface of the valve of that port (e.g., the first valve) or at an opposite side of the valve seating surface of the valve of that port. In some examples of this aspect of the technology, the fourth port may be connected to a pump (e.g., a foot activated pump), a compressor, the external environment, and/or some other source of gas for introduction into the fluid flow control system.

Additional aspects of this technology relate to sole structures for articles of footwear that include at least: (a) a fluid flow control system of any of the types described above (and of any of the types described in more detail below); (b) a fluid container (e.g., a pump (e.g., a foot activated pump), a compressor, a fluid reservoir, a fluid-filled bladder, etc.) in fluid communication with the first port; and (c) a foot support member (e.g., a fluid-filled bladder) in fluid communication with the second port. In some examples of these aspects of the technology, the third port may be in fluid communication with the external environment (e.g., to vent gas from the fluid container and/or foot support member to the external environment).

When provided in an article of footwear, the foot support member and the fluid container may be included in the footwear sole structure (e.g., as at least part of a footwear midsole). Additionally or alternatively, at least some portion of the foot support member and/or the fluid container (including the entire fluid container) may be engaged with or provided as part of the footwear upper (which is engaged with the sole structure). As yet some additional or alternative features, the manifold body may be engaged with one or more of the footwear upper, the sole structure, the foot support member, and/or the fluid container without departing from this technology.

Additional aspects of this technology relate to footwear foot support systems, e.g., for an article of footwear, that include: (a) a foot support bladder; (b) a fluid source container; (c) a manifold body defining an internal chamber; (d) a first port placing the fluid source container in fluid communication with the internal chamber; (e) a second port placing the foot support bladder in fluid communication with the internal chamber; (f) a third port in fluid communication with the internal chamber and with an external environment; (g) a first valve controlling fluid flow between the internal chamber and the fluid source container through the first port, wherein the first valve includes a first valve activator; (h) a second valve controlling fluid flow between the internal chamber and the foot support bladder through the second port, wherein the second valve includes a second valve activator; (i) a third valve controlling fluid flow between the internal chamber and the external environment through the third port, wherein the third valve includes a third valve activator; and (j) a movable cam at least partially located within the internal chamber. The movable cam may include: (a) one or more first valve activator surfaces that interact with the first valve activator to change the first valve between a closed configuration and an open configuration when the movable cam is moved, (b) one or more second valve activator surfaces that interact with the second valve activator to change the second valve between a closed configuration and an open configuration when the movable cam is moved, and (c) one or more third valve activator surfaces that interact with the third valve activator to change the third valve between a closed configuration and an open configuration when the movable cam is moved. The foot support bladder; the fluid source container; the manifold body; the port(s) (e.g., the first, second, and third port(s) and optionally any other ports present); the valve(s) (e.g., the first, second, and third valve(s) and optionally any other valves present); and/or the movable cam (including its activator surface(s)) may have any of the structures, features, and/or options described above (and any of the structures, features, and/or options described in more detail below).

In these example aspects of this technology, the movable cam may be movable (e.g., slidable and/or rotatable, e.g., under operation of a motor) at least between one or more of:

(A) at least one position that is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another—in this foot support/external environment fluid exchange configuration, fluid may move from the foot support bladder to the external environment through the internal chamber (e.g., to reduce pressure in the foot support bladder);

(B) at least one position that is a fluid source/foot support fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another—in this fluid source/foot support fluid exchange configuration, fluid may move from the fluid source container to the foot support bladder through the internal chamber or from the foot support bladder to the fluid source container through the internal chamber (e.g., depending on their relative pressures);

(C) at least one position that is a fluid source/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) at least one of the one or more first valve activator surfaces interacts with the first valve activator to thereby place the first valve in the open configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the fluid source container and the external environment in fluid communication with one another—in this fluid source/external environment fluid exchange configuration, fluid may move from the fluid source container to the external environment through the internal chamber (e.g., to reduce pressure in the fluid source container);

(D) at least one position that is a system closed configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration and to thereby stop fluid flow into and out of the manifold body (e.g., to maintain fluid pressures in the foot support bladder and the fluid container); and/or (E) at least one position that is a system open configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby allow free fluid passage into and out of the manifold body (e.g., to equalize pressure in all parts of the foot support system).

In accordance with at least some examples of this aspect of the technology, the fluid source container may include one or more pumps (e.g., in some examples one or more foot-activated pumps, such as one or more forefoot activated pumps, one or more heel activated pumps, one or more bulb pumps, etc.; one or more instep area mounted pumps; one or more footwear tongue mounted pumps; one or more upper mounted pumps; one or more pumps in a forefoot region of the foot support system; one or more pumps in a midfoot region of the foot support system; one or more pumps in the heel region of the foot support system; etc.). Additionally or alternatively, the fluid source container may include one or more compressors (e.g., located at any one or more of the positions described above for the one or more pumps) and/or one or more fluid filled reservoirs for containing a gas (such as one or more fluid filled bladders).

In at least some examples of this technology, the fluid source container will be a fluid reservoir (e.g., a fluid filled bladder engaged with the footwear upper and/or sole structure). In some such examples, the manifold body further may include a fourth port, and that fourth port may be in fluid communication with the first port and/or with the internal chamber of the manifold body. Fluid from a fluid source (e.g., one or more compressors and/or pumps, e.g., of any of the types described above) may be supplied to the fluid filled reservoir through the fourth port and the first port, e.g., with or without passing through the internal chamber of the manifold body. The fourth port, when present, may have any of the structures, features, and/or options described for the fourth port described above, including any of the above described options for connecting to the first port (e.g., on the manifold body internal chamber side or the opposite side of a valve seating surface of the first valve, through a shared wall of the first and fourth ports, through a separate valve and valve activator surface arrangement as part of the manifold, etc.).

Additional aspects of this technology relate to articles of footwear including an upper and a footwear foot support system according to any of the features and/or aspects described above (and/or described in more detail below). The foot support systems may be provided as, provided as part of, and/or engaged with the sole structure of the article of footwear (e.g., as or as part of a midsole component or other impact force attenuating component). Additionally or alternatively, at least some portions of the foot support system (e.g., some or all of the manifold body, some or all of the fluid source container, some or all of the foot support component, etc.) may be formed as, formed as part of, and/or engaged with the footwear upper.

Additional examples and aspects of this technology relate to articles of footwear and/or other foot-receiving devices that include sole structures, fluid flow control systems, and/or foot support systems of any of the various examples and aspects described above and/or described in more detail below. Still additional examples and aspects of this technology relate to methods of making such sole structures, fluid flow control systems, foot support systems, articles of footwear, and/or foot-receiving devices and/or methods of using such sole structures, fluid flow control systems, foot support systems, articles of footwear, and/or foot-receiving devices, e.g., to support a wearer's foot.

Given the general description of features, examples, aspects, structures, processes, and arrangements according to certain embodiments of the technology provided above, a more detailed description of specific example fluid flow control systems, foot support structures, articles of footwear, and methods in accordance with this technology follows.

II. Detailed Description of Example Articles of Footwear, Foot Support Systems, and Other Components and/or Features According to this Technology Referring to the figures and following discussion, various examples of foot support systems, fluid flow control systems, sole structures, and articles of footwear in accordance with aspects of this technology are described. Aspects of this technology may be used, for example, in conjunction with foot support systems, articles of footwear (or other foot-receiving devices), and/or methods described in any one or more the various U.S. patent applications noted above.

FIG. 1A provides a side view of an example article of footwear 100 in accordance with at least some aspects of this technology. The article of footwear 100 includes an upper 102 and a sole structure 104 engaged with the upper 102. The upper 102 may be made of any desired materials, including conventional materials as are known and used in the footwear arts. Examples of suitable materials for the upper 102 include one or more of: woven fabric, knitted fabric, leather (natural or synthetic), canvas, polyester, cotton, other fabrics or textiles, thermoplastic polyurethanes, other plastics, etc. The upper 102 defines a foot insertion opening 106 that allows access to a foot-receiving chamber 100C defined at least in part by the upper 102 and/or the sole structure 104. A closure system 108 (e.g., a lace and lacing system in this illustrated example) is provided to releasably secure the article of footwear 100 to a wearer's foot (e.g., in any conventional manner).

Each of the upper 102 and the sole structure 104 may be formed from one or more component parts. When formed from multiple component parts, these component parts may be engaged together in any desired manner, including via one or more of: adhesives or cements; sewn seams; mechanical connectors; fusing techniques; and/or other manners, including in conventional manners as are known and used in the footwear arts. Likewise, the upper 102 and sole structure 104 may be engaged together in any desired manner, including via one or more of: adhesives or cements; sewn seams; mechanical connectors; fusing techniques; and/ or other manners, including in conventional manners as are known and used in the footwear arts.

The article of footwear 100 of FIG. 1A includes features of a foot support system (e.g., at least partially included with the sole structure 104) and a fluid flow control system (a portion of which is shown at elements 500-700 in FIG. 1A) in accordance with examples and aspects of this technology. A more detailed description of example foot support systems and fluid flow control systems in accordance with aspects of this technology will be described in detail below in conjunction with FIGS. 1A-6.

Figure 1B:
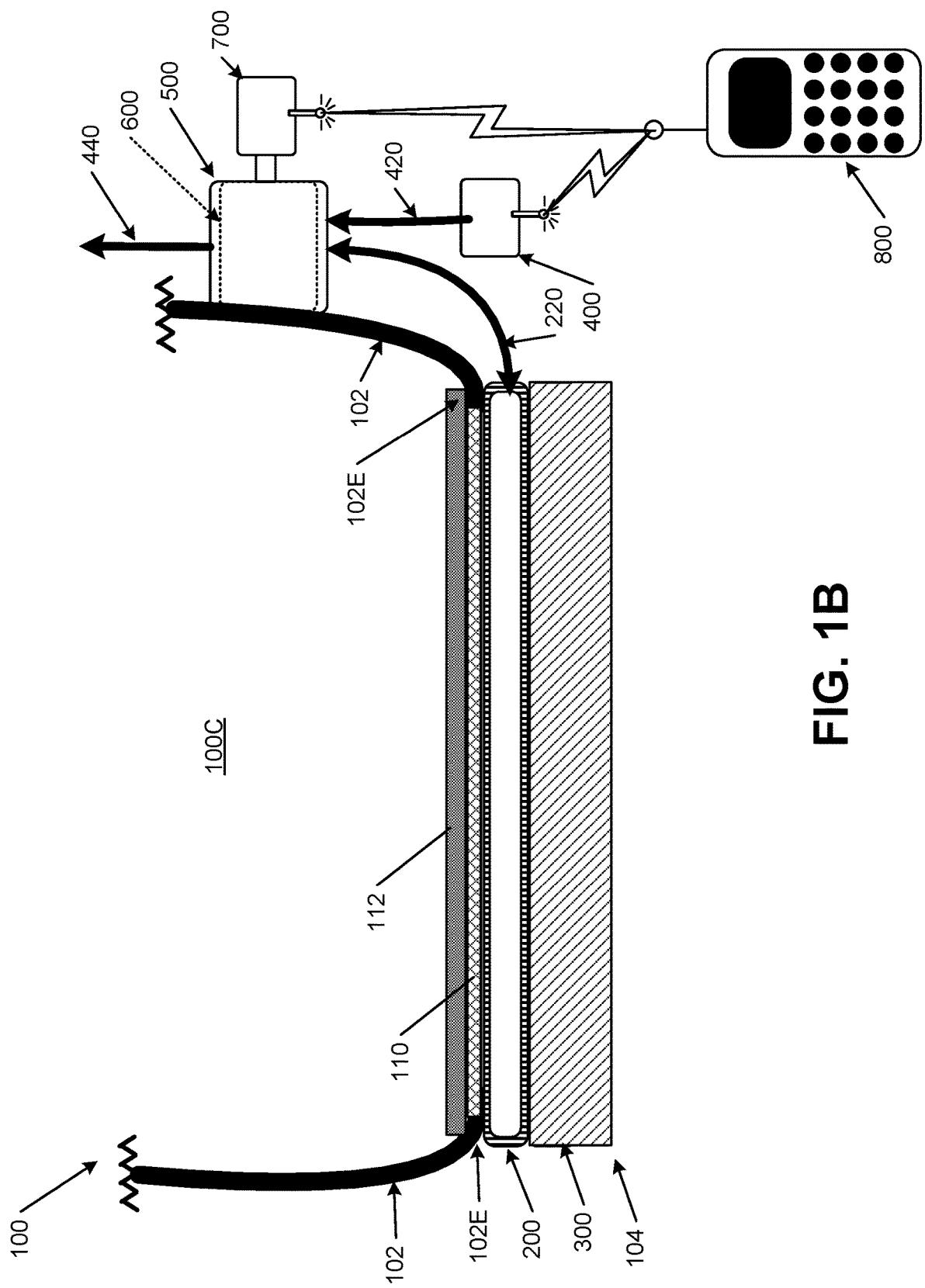

FIG. 1B provides a transverse (medial side-to-lateral side), vertical cross-sectional view of an example article of footwear 100 showing a general arrangement of example component parts in accordance with at least some examples of this technology. This example article of footwear 100 includes upper 102 having its bottom edges 102E connected to a strobel member 110 (e.g., by stitching, adhesives, mechanical connectors, fusing techniques, etc.). The strobel member 110 closes off at least a portion of the bottom of the upper 102 (and partially defines the foot-receiving chamber 100C of the footwear 100). The bottom of the strobel member 110 is engaged with a sole structure 104 (optionally fixed in any desired manner, including by stitching, adhesives, mechanical connectors, fusing techniques, etc.). A sock liner 112 or insole element may be provided in the interior foot-receiving chamber 100C.

The sole structure 104 of this example article of footwear 100 includes: (a) one or more sole components 300 (e.g., one or more footwear outsole components, one or more footwear midsole components, etc.) and (b) one or more foot support components 200 in the form of a foot support fluid-filled bladder (e.g., engaged with and/or supported by the sole component(s) 300). A fluid source 400 (e.g., including one or more of: a pump (e.g., a foot activated pump), a compressor, a fluid-reservoir (which in some examples may constitute a fluid-filled bladder incorporated into the upper 102 and/or sole structure 104), the ambient environment, etc.) is in fluid communication with the foot support component 200 via fluid transfer line 420, manifold 500, and movable cam 600, as will be described in more detail below. These components allow one to alter the fluid pressure in the foot support component 200, e.g., by adding gas to the foot support component 200 and/or removing gas from the foot support component 200 (and thereby changing the gas pressure in the foot support component 200 that supports some or all of a plantar surface of a wearer's foot). Movable cam 600 may be controlled by a motor 700 or other component, which in some examples of this technology may be electronically controlled, e.g., via an input device 800 (such as a cellular telephone running an application program, a computing device, an input device mounted on the upper 102 and/or sole structure 104, a manually movable switch (e.g., a dial), etc.), to allow selection of different foot support pressures. Pressure change input may be entered electronically, automatically, and/or manually, resulting in changing of the components in fluid communication with the manifold 500.

Figure 1C:
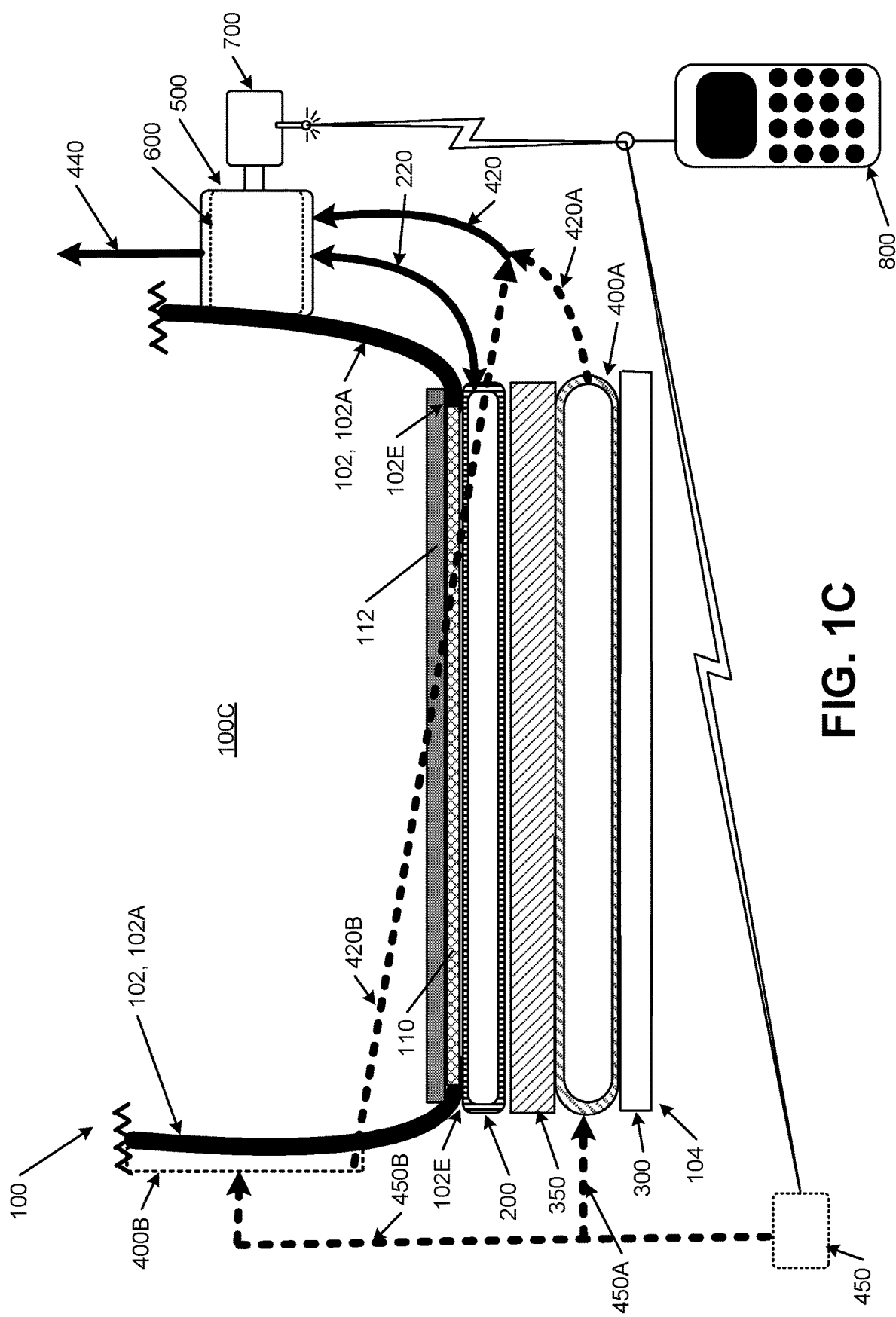

FIG. 1C provides a transverse (medial side-to-lateral side), vertical cross-sectional view of another example article of footwear 100 showing a general arrangement of component parts in accordance with at least some examples of this technology. Where the same reference numbers are used in FIG. 1C as in FIG. 1B, the same or similar parts and/or features are intended.

The example article of footwear 100 shown in FIG. 1C includes some components and/or features of the fluid source 400 (from FIG. 1B) incorporated into the footwear 100 structure. More specifically, FIG. 1C shows a fluid reservoir or container 400A incorporated into the sole structure 104, e.g., engaged with a footwear sole structure 104. In this specific example, the fluid reservoir 400A is engaged with and between: (a) an outsole component 300 (e.g., made from rubber, TPU, foam, or a conventional footwear outsole material) and (b) a foam midsole component 350 (e.g., made from polyurethane foam or EVA foam). Additionally or alternatively, FIG. 1C shows a fluid reservoir or container 400B incorporated into the footwear upper 102, e.g., engaged with a footwear upper component 102A, such as a fabric, textile, leather, or plastic upper component 102A, by adhesives, cements, or stitching; integrally formed as or incorporated into a footwear upper component (e.g., such as a tongue element, a heel component, a cushioning component, a heel counter or other support component, etc.); or the like. The fluid reservoir(s) 400A and/or 400B may take on any desired structures, such as a fluid-filled bladder, a fluid tank, etc. Fluid transfer lines 420A and 420 shown in FIG. 1C place fluid reservoir 400A (when present) in fluid communication with manifold 500 and/or fluid transfer lines 420B and 420 shown in FIG. 1C place fluid reservoir 400B (when present) in fluid communication with manifold 500. The fluid transfer line(s) 420, 420A, and/or 420B may take on any desired structure, including flexible plastic tubing, fluid channels molded or otherwise formed in a footwear component, other types of tubing or hoses, etc. An individual article of footwear 100 may include one or more of: (a) one or more sole structure 104 based fluid reservoirs 400A, (b) one or more upper 102 based fluid reservoirs 400B, (c) and/or one or more other desired fluid reservoirs or containers (e.g., as separate components).

As further shown in FIG. 1C, one or more of fluid reservoirs 400A and/or 400B may be in fluid communication with a fluid source 450, e.g., via fluid transfer lines 450A and/or 450B. Fluid transfer lines 450A and/or 450B, when present, may be any of the types described above in conjunction with fluid transfer lines 420, 420A, and 420B. The fluid source 450 may include one or more of: a pump (e.g., a foot activated pump), a compressor, another fluid-reservoir or container (optionally one not included as part of the footwear 100 structure), the ambient environment, etc. Additionally or alternatively, if desired, in some examples of this technology, the fluid source 450 may receive fluid discharged from the manifold 500 (e.g., via outlet line 440). In at least some examples of this technology, transfer of fluid from the fluid source 450 to the fluid reservoir(s) 400A and/or 400B may be controlled, at least in part, by an input device, such as input device 800 as shown in FIG. 1C and/or of the types described above. For example, when a user requests a change in pressure in the foot support component 200, the fluid source 450 may be activated, if needed, to supply more fluid to the fluid reservoir(s) 400A and/or 400B.

Example operation of example fluid flow control systems 1000 useful in articles of footwear 100 of the types described above in conjunction with FIGS. 1A-1C now will be described in detail in conjunction with FIGS. 2A-2G. In particular, FIGS. 2A-2G illustrate potential example features and operation of a fluid flow control system 1000 including at least a manifold 500 and a motor 700 used to control a movable cam 600 provided in the manifold 500, e.g., like the fluid flow control system components shown in FIGS. 1A-1C. Motor 700 may be controlled at least in part by an input device 800, like those described above in conjunction with FIGS. 1A-1C.

Figure 2A:
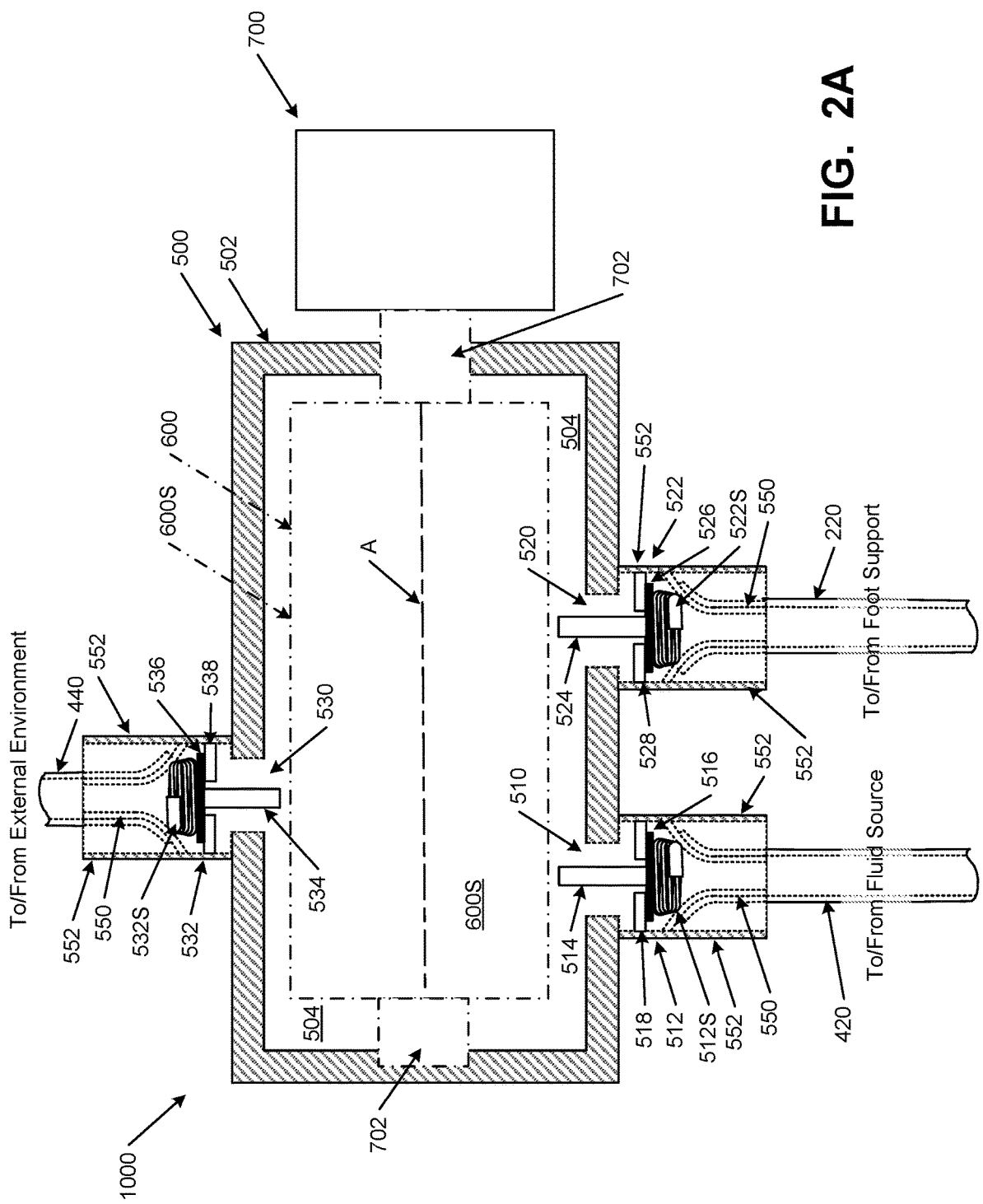
FIGS. 2A-2G provide multiple views of fluid flow control systems and various component parts thereof, including various example operational states for such fluid flow control systems, in accordance with some examples of this technology.
Figure 2B:
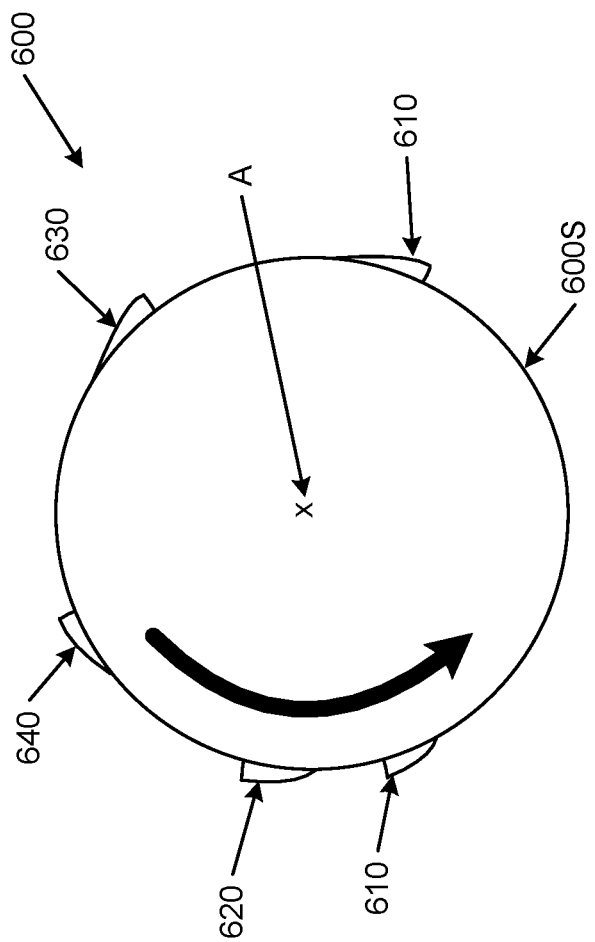

FIG. 2A shows example basic components of at least a portion of a fluid flow control system 1000 for an article of footwear 100 that includes manifold 500, movable cam 600, and motor 700. As shown in FIG. 2A, this example fluid flow control system 1000 includes a manifold 500 having: (a) a manifold body 502 defining an internal chamber 504; (b) a first port 510 in fluid communication with the internal chamber 504; (c) a second port 520 in fluid communication with the internal chamber 504; and (d) a third port 530 in fluid communication with the internal chamber 504. A first valve 512 controls fluid flow through the first port 510 through operation of a first valve activator 514, e.g., a rigid bar that may be included as part of or engaged with the first valve 512. Similarly, in this example structure: (a) a second valve 522 controls fluid flow through the second port 520 through operation of a second valve activator 524, e.g., a rigid bar that may be included as part of or engaged with the second valve 522, and (b) a third valve 532 controls fluid flow through the third port 530 through operation of a third valve activator 534, e.g., a rigid bar may be included as part of or engaged with the third valve 532. While other structures are possible, in this illustrated example:

(a) the first valve 512 includes a valve closure part 516 engaged and movable with the first valve activator 514 to be movable between positions in contact with a valve seat 518 (to seal and/or close the first valve 512) and out of contact with the valve seat 518 (to open the first valve 512);

(b) the second valve 522 includes a valve closure part 526 engaged and movable with the second valve activator 524 to be movable between positions in contact with a valve seat 528 (to seal and/or close the second valve 522) and out of contact with the valve seat 528 (to open the second valve 522); and (c) the third valve 532 includes a valve closure part 536 engaged and movable with the third valve activator 534 to be movable between positions in contact with a valve seat 538 (to seal and/or close the third valve 532) and out of contact with the valve seat 538 (to open the third valve 532).

Springs 512S, 522S, and 532S bias the first valve 512, the second valve 522, and the third valve 532, respectively, into closed positions (e.g., a sealed condition or a fluid flow stop condition) when no external force (e.g., from movable cam 600) is applied to their respective valve activators 514, 524, 534. In the example shown in FIG. 2A, all valves 512, 522, and 532 are shown in their closed configurations (e.g., with their respective valve closure parts 516, 526, 536 sealingly seated in the respective valve seats 518, 528, 538 under biasing force applied by their respective springs 512S, 522S, 532S). Notably, in the configuration of FIG. 2A, the cam surface 600S does not contact any of valve activators 514, 524, 534, and thus, their springs 512S, 522S, 532S push valves 512, 522, 532 closed.

As further shown in FIG. 2A, a movable cam 600 is at least partially located within the internal chamber 504 of the manifold body 502. Looking also at FIG. 2B (which shows an end view of cam 600 looking down its axis A), this example movable cam 600 includes: (a) one or more first valve activator surfaces 610 that interact with the first valve activator 514 (as will be described in more detail below) to change the first valve 512 between a closed configuration and an open configuration when the movable cam 600 is moved, (b) one or more second valve activator surfaces 620 that interact with the second valve activator 524 (as will be described in more detail below) to change the second valve 522 between a closed configuration and an open configuration when the movable cam 600 is moved, and (c) one or more third valve activator surfaces 630 that interact with the third valve activator 534 (as will be described in more detail below) to change the third valve 532 between a closed configuration and an open configuration when the movable cam 600 is moved. Movable cam 600 in this illustrated example is mounted on a rotatable shaft 702, which may be rotated through operation of motor 700. The shaft 702 may extend into and/or out of the manifold body 502 in a sealed manner (e.g., so that gas does not escape from the chamber 504 through the shaft port(s)). Various operational positions of cam 600 with respect to the manifold 500 and its valves 512, 522, and 532 will be described in more detail in conjunction with FIGS. 2A and 2C-2F.

Although other arrangements are possible, in this example fluid flow control system 1000, the first port 510 and first valve 512 may connect to a fluid line 420 that extends to a fluid source 400 (e.g., as described above and shown in FIGS. 1A-1C). The second port 520 and second valve 522 may connect to a fluid line 220 that extends to the foot support component 200 (e.g., as described above and shown in FIGS. 1A-1C). The third port 530 and third valve 532 may connect the manifold 500 interior chamber 504 to the external environment and/or back to a fluid source 400 (e.g., a fluid reservoir 400A, 400B). Optionally, third port 530 may include a fluid line 440 that extends away from the manifold to the desired destination for fluid moved out of interior chamber 504 (e.g., as described above and/or in more detail below). As shown in FIG. 2A, one or more of ports 510, 520, 530 may include appropriate structure 550 to engage a fluid line (e.g., 420, 220, 440), such as a hose fitting, coupler, or the like, that engages a flexible plastic tube (that functions as the fluid line) or other fluid line component. Port walls 552 (e.g., as cylindrical structures) may be provided, e.g., as structure for the valve(s) 512, 524, 534 and/or to conceal and/or protect the connector structure 550 and valve 512, 524, 534 parts. Any desired way of securing the fluid line(s) (e.g., 420, 220, 440) to its respective port 510, 520, 530, both removably and/or fixedly, may be used without departing from this technology.

While FIG. 2A shows all of the ports 510, 520, 530; valves 512, 522, 532; activators 514, 524, 534; and/or fluid line connecting structures 550 comprised of the same general parts and constructions, the specific structures of the individual ports 510, 520, 530; individual valves 512, 522, 532; individual activators 514, 524, 534; and/or individual fluid line connecting structures 550 in a single manifold 500 may differ from one another in at least some examples of this technology (e.g., differ in size, shape, construction, parts, etc.). The manifold 500 may be made from plastic (e.g., by injection molding), metal, and/or any desired materials and/or in any manner, including in conventional materials and conventional manners as known and used in the appropriate arts.

FIG. 2A illustrates this example fluid flow control system 1000 in one operational state-a "closed" operational state. This operational state corresponds to at least one distinct position of the movable cam 600 with respect to the manifold body 502 (and/or its ports 510, 520, 530, and/or its valves 512, 522, 532, and/or its valve activators 514, 524, 534). In this operational state, the movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) none of the one or more first valve activator surfaces 610 interacts with the first valve activator 514 to thereby place the first valve 512 in the closed configuration, (b) none of the one or more second valve activator surfaces 620 interacts with the second valve activator 524 to thereby place the second valve 522 in the closed configuration, and (c) none of the one or more third valve activator surfaces 630 interacts with the third valve activator 534 to thereby place the third valve 532 in the closed configuration. In this operational state, no fluid flows through the manifold 500. This operational state, which may be called a "closed operational state," may be used, for example, to hold the foot support component 200 (and the overall fluid flow control system 1000) at set pressures.

Figure 2C:
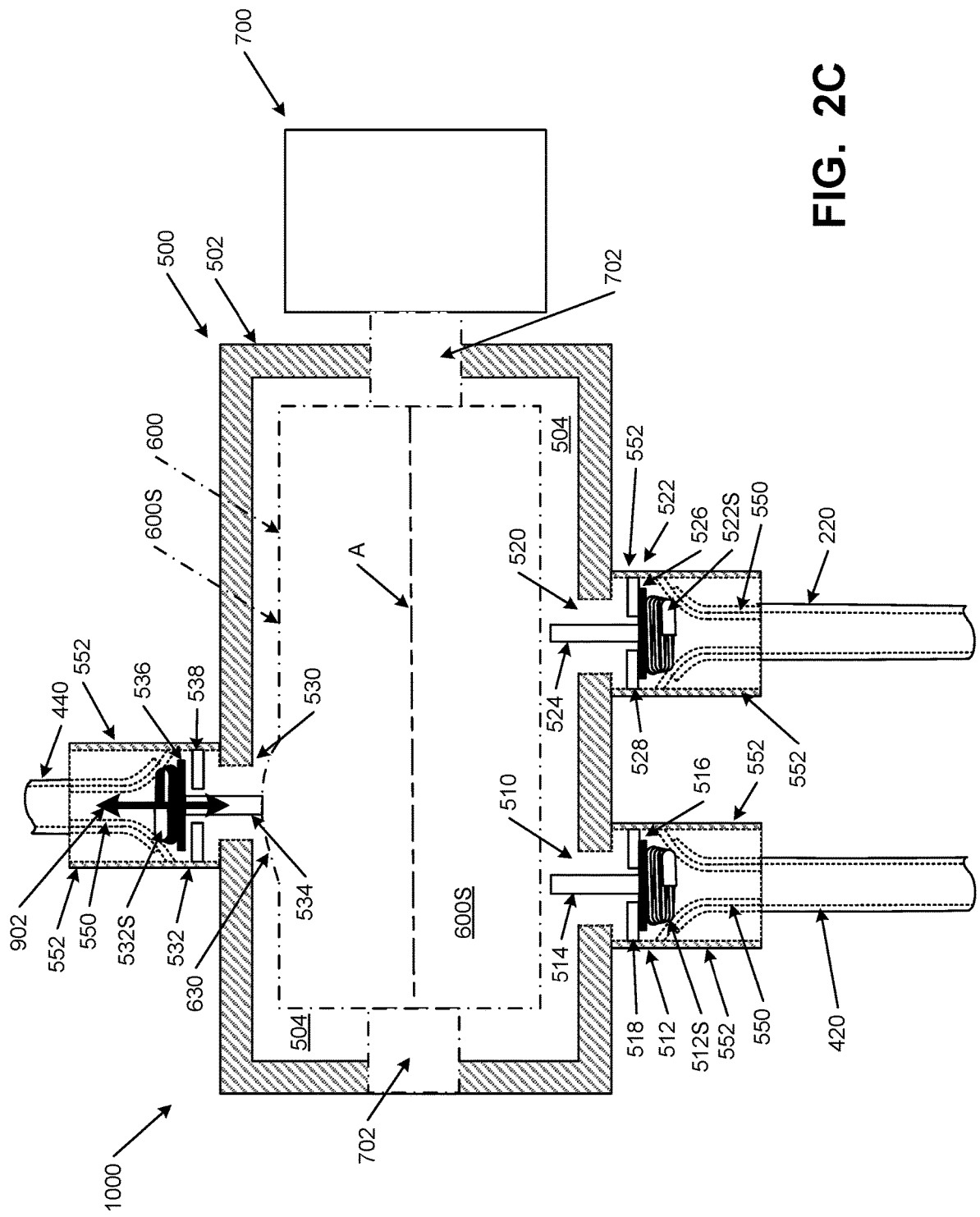

FIG. 2C illustrates this example fluid flow control system 1000 in another operational state.

This operational state corresponds to at least one distinct position of the movable cam 600 with respect to the manifold body 502 (and/or its ports 510, 520, 530, and/or its valves 512, 522, 532, and/or its valve activators 514, 524, 534). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) none of the one or more first valve activator surfaces 610 interacts with the first valve activator 514 to thereby place the first valve 512 in the closed configuration, (b) none of the one or more second valve activator surfaces 620 interacts with the second valve activator 524 to thereby place the second valve 522 in the closed configuration, and (c) at least one of the one or more third valve activator surfaces 630 interacts with the third valve activator 534 to thereby place the third valve 532 in the open configuration. As shown in FIG. 2C, in this operational state, the raised surface 600S of the movable cam 600 at third valve activator surface 630 pushes and moves the third valve activator 534 (upward, in the arrangement of FIG. 2C) to compress spring 532S. This action unseats third valve closure part 536 from the third valve seat 538 and opens the third valve 532, which allows fluid to flow through the third valve 532 and third port 530 (theoretically in either direction, see arrow 902, depending on the relative pressures on the opposite sides of third valve 532). This operational state may be used, for example, to vent fluid from the interior chamber 504 of the manifold body 502 to the external atmosphere and/or to move fluid from the interior chamber 504 to another fluid storage container and/or to a power harvesting system.

While FIG. 2C shows only valve 534 in the open configuration, similar arrangements of the cam activator surfaces 610, 620, 630 could be used to selectively open only the first valve 512 or only the second valve 522 in a similar manner. Such arrangements could equalize the pressure in the manifold 500 internal chamber 504 to match the pressure in fluid transfer line 420 or fluid transfer line 220, respectively, and/or to reduce pressure within fluid transfer line 420 or fluid transfer line 220, respectively.

Figure 2D:
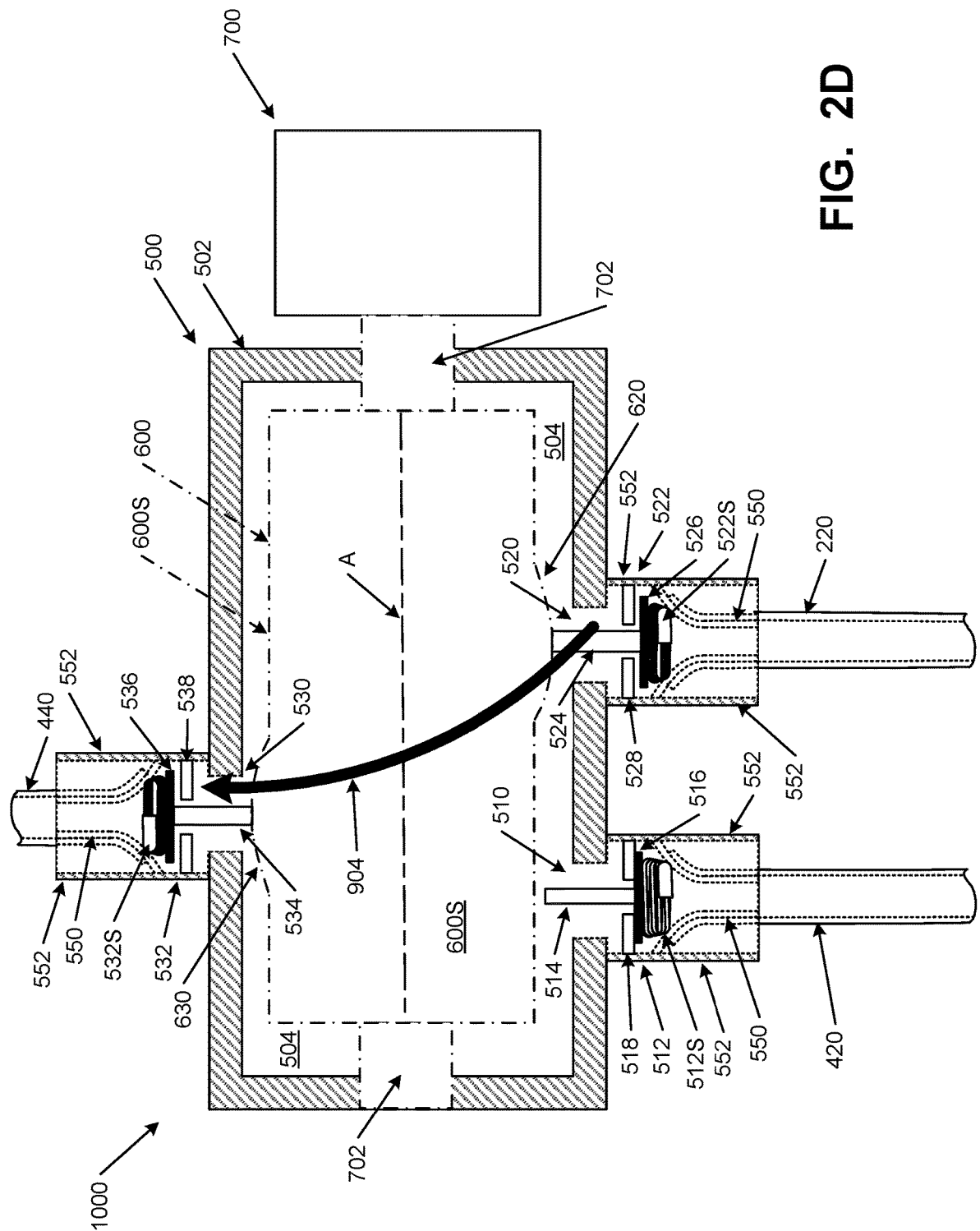

Another operational state of this example fluid flow control system 1000 is shown in FIG. 2D—a second port/third port fluid exchange configuration. This operational state corresponds to at least one distinct position of the movable cam 600 with respect to the manifold body 502 (and/or its ports 510, 520, 530, and/or its valves 512, 522, 532, and/or its valve activators 514, 524, 534). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) none of the one or more first valve activator surfaces 610 interacts with the first valve activator 514 to thereby place the first valve 512 in the closed configuration, (b) at least one of the one or more second valve activator surfaces 620 interacts with the second valve activator 524 to thereby place the second valve 522 in the open configuration, and (c) at least one of the one or more third valve activator surfaces 630 interacts with the third valve activator 534 to thereby place the third valve 532 in the open configuration. As shown in FIG. 2D, in this operational state: (a) the raised surface 600S of the movable cam 600 at second valve activator surface 620 pushes and moves the second valve activator 524 (downward, in the arrangement of FIG. 2D) to compress spring 522S, and (b) the raised surface 600S of the movable cam 600 at third valve activator surface 630 pushes and moves the third valve activator 534 (upward, in the arrangement of FIG. 2D) to compress spring 532S. This action: (a) unseats second valve closure part 526 from the second valve seat 528 and opens the second valve 522 and allows fluid to flow through the second valve 522 and second port 520, and (b) unseats third valve closure part 536 from the third valve seat 538 and opens the third valve 532 and allows fluid to flow through the third valve 532 and third port 530. This operational state allows fluid exchange between the second port 520 and the third port 530 through the manifold body 502 (theoretically in either direction). In the example footwear structure 100 of FIGS. 1A-1C, because the pressure in the foot support component 200 generally will be larger than external atmospheric pressure, fluid will generally flow in that shoe 100 from the foot support line 220, through second valve 522 and second port 520, through the manifold interior chamber 504, and out through third valve 532 and third port 530 (e.g., through fluid line 440 and/or to the external atmosphere or other desired destination). See arrow 904. This operational state may be used, for example, to reduce pressure in the foot support component 200, e.g., in response to user input via input device 800, and it may be referred to as "a foot support/external environment fluid exchange configuration."

Figure 2E:
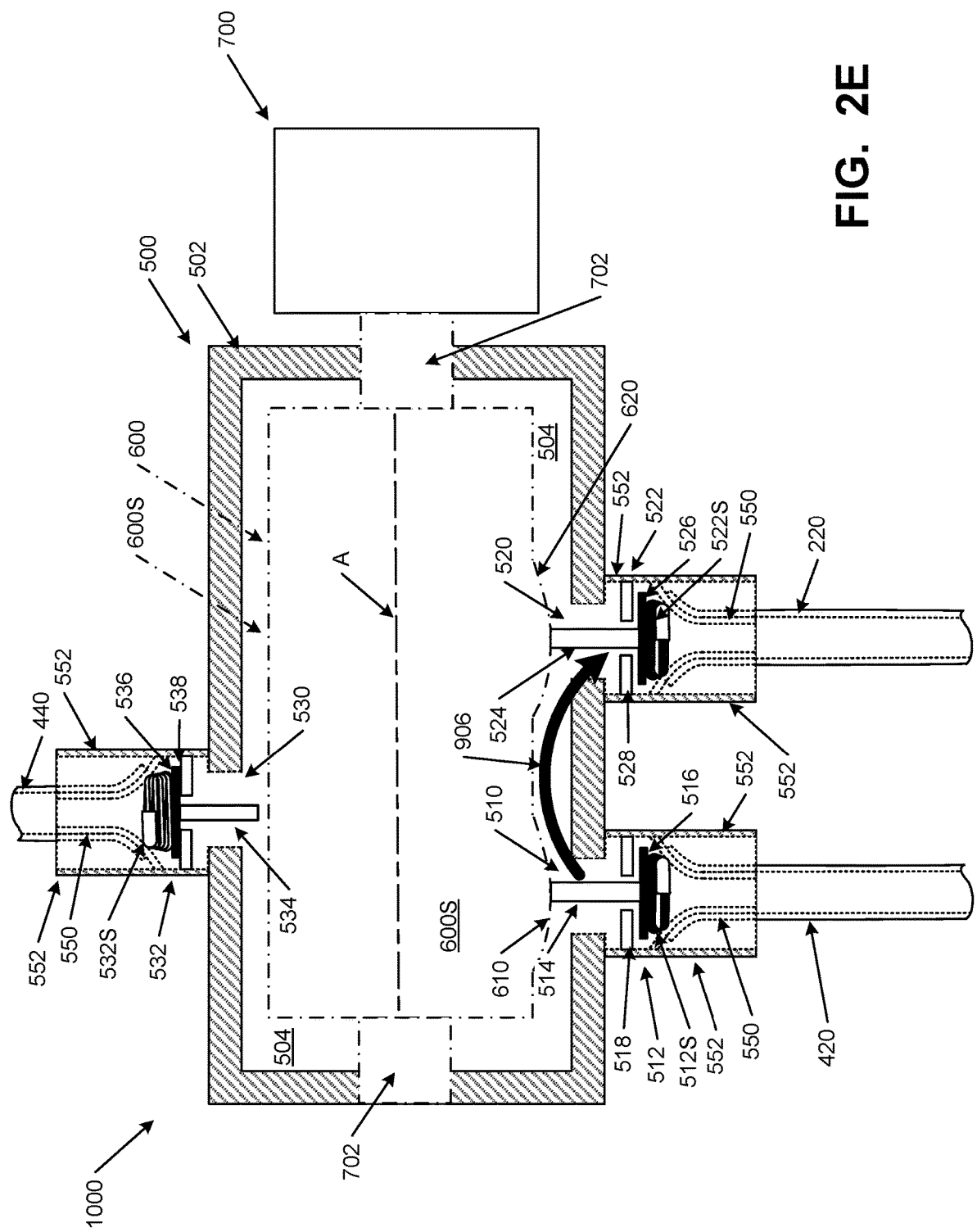

FIG. 2E illustrates another operational state of this example fluid flow control system 1000—a first port/second port fluid exchange configuration. This operational state corresponds to at least one distinct position of the movable cam 600 with respect to the manifold body 502 (and/or its ports 510, 520, 530, and/or its valves 512, 522, 532, and/or its valve activators 514, 524, 534). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) at least one of the one or more first valve activator surfaces 610 interacts with the first valve activator 514 to thereby place the first valve 512 in the open configuration, (b) at least one of the one or more second valve activator surfaces 620 interacts with the second valve activator 524 to thereby place the second valve 522 in the open configuration, and (c) none of the one or more third valve activator surfaces 630 interacts with the third valve activator 534 to thereby place the third valve 532 in the closed configuration. As shown in FIG. 2E, in this operational state: (a) the raised surface 600S of the movable cam 600 at first valve activator surface 610 pushes and moves the first valve activator 514 (downward, in the arrangement of FIG. 2E) to compress spring 512S, and (b) the raised surface 600S of the movable cam 600 at second valve activator surface 620 pushes and moves the second valve activator 524 (downward, in the arrangement of FIG. 2E) to compress spring 522S. This action: (a) unseats first valve closure part 516 from the first valve seat 518, opens the first valve 512, and allows fluid to flow through the first valve 512 and first port 510, and (b) unseats second valve closure part 526 from the second valve seat 528, opens the second valve 522, and allows fluid to flow through the second valve 522 and second port 520. This operational state allows fluid exchange between the first port 510 and the second port 520 through the manifold body 502 (theoretically in either direction). In the example footwear structure 100 shown in FIGS. 1A-1C, because the pressure in the fluid source component(s) (e.g., 400, 400A, 400B) will generally be larger than the foot support 200 pressure, fluid in that shoe 100 will generally flow from the fluid supply line 420, through the first valve 512 and the first port 510, through the manifold interior chamber 504, and out through the second valve 522 and the second port 520 (e.g., through fluid line 220 and to the foot support component 200). See arrow 906. This operational state may be used, for example, to increase pressure in the foot support component 200, e.g., in response to user input via input device 800, and it may be referred to as "a fluid source/foot support fluid exchange configuration."

Figure 2F:
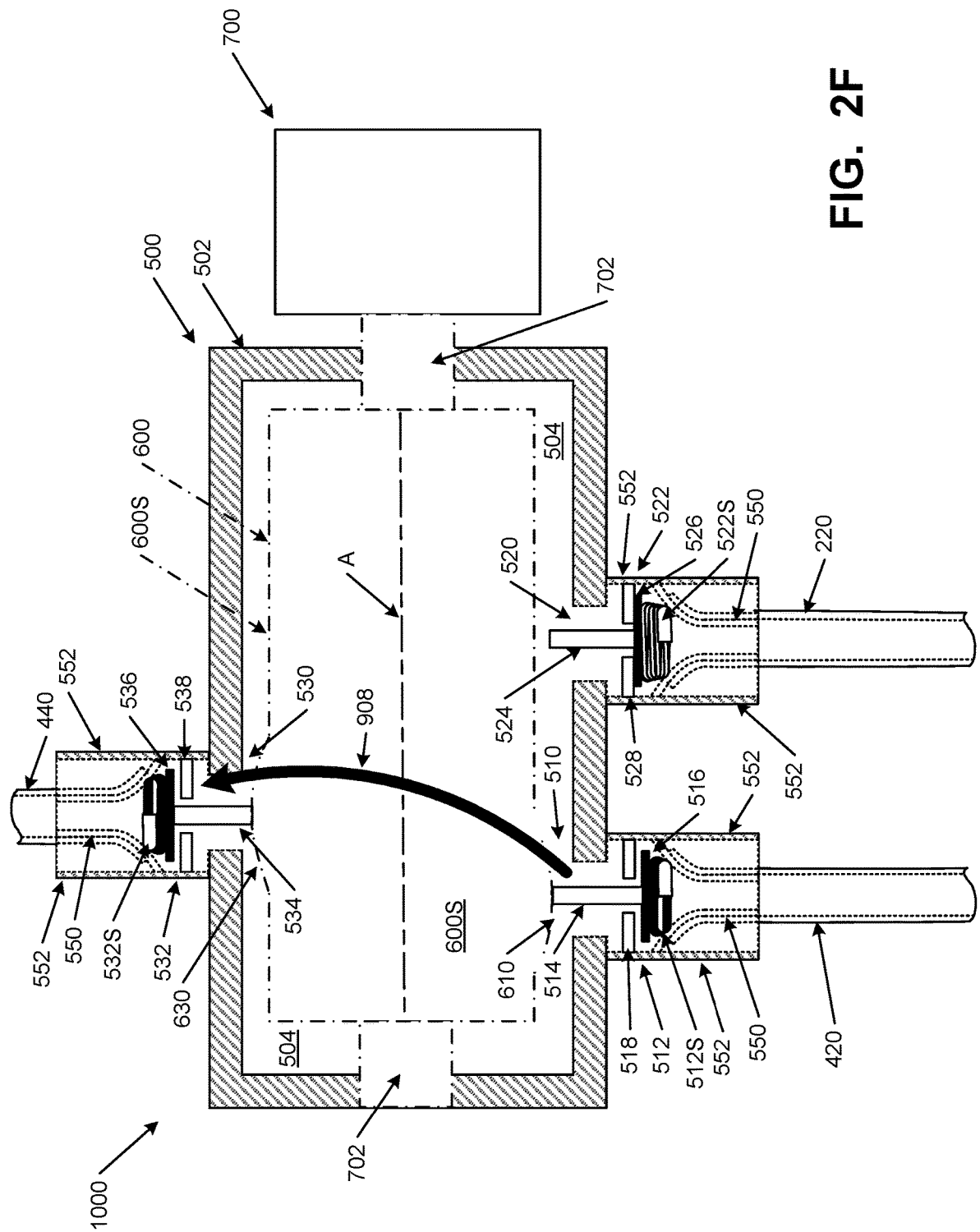

FIG. 2F illustrates another operational state of this example fluid flow control system 1000—a first port/third port fluid exchange configuration. This operational state corresponds to at least one distinct position of the movable cam 600 with respect to the manifold body 502 (and/or its ports 510, 520, 530, and/or its valves 512, 522, 532, and/or its valve activators 514, 524, 534). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) at least one of the one or more first valve activator surfaces 610 interacts with the first valve activator 514 to thereby place the first valve 512 in the open configuration, (b) none of the one or more second valve activator surfaces 620 interacts with the second valve activator 524 to thereby place the second valve 522 in the closed configuration, and (c) at least one of the one or more third valve activator surfaces 630 interacts with the third valve activator 534 to thereby place the third valve 532 in the open configuration. As shown in FIG. 2F, in this operational state: (a) the raised surface 600S of the movable cam 600 at first valve activator surface 610 pushes and moves the first valve activator 514 (downward, in the arrangement of FIG. 2F) to compress spring 512S, and (b) the raised surface 600S of the movable cam 600 at third valve activator surface 630 pushes and moves the third valve activator 534 (upward, in the arrangement of FIG. 2F) to compress spring 532S. This action: (a) unseats first valve closure part 516 from the first valve seat 518, opens the first valve 512, and allows fluid to flow through the first valve 512 and first port 510, and (b) unseats third valve closure part 536 from the third valve seat 538, opens the third valve 532, and allows fluid to flow through the third valve 532 and third port 530. This operational state allows fluid exchange between the first port 510 and the third port 530 through the manifold body 502 (theoretically in either direction). In the example footwear structure 100 shown in FIGS. 1A-1C, because the pressure in the fluid source component(s) (e.g., 400, 400A, 400B) will generally be larger than atmospheric pressure, fluid will generally flow in that shoe 100 from the fluid supply line 420, through the first valve 512 and the first port 510, through the manifold interior chamber 504, and out through the third valve 532 and the third port 530 (e.g., through fluid line 440 and to the external environment or other desired destination). See arrow 908. This operational state may be used, for example, to decrease pressure in the fluid source reservoir(s) 400A, 400B, and it may be referred to as "a fluid source/external environment fluid exchange configuration." Such an operational state may be used, for example, if a foot activated pump continually supplies fluid to fluid reservoir(s) 400 on a step-by-step basis.

Figure 2G:
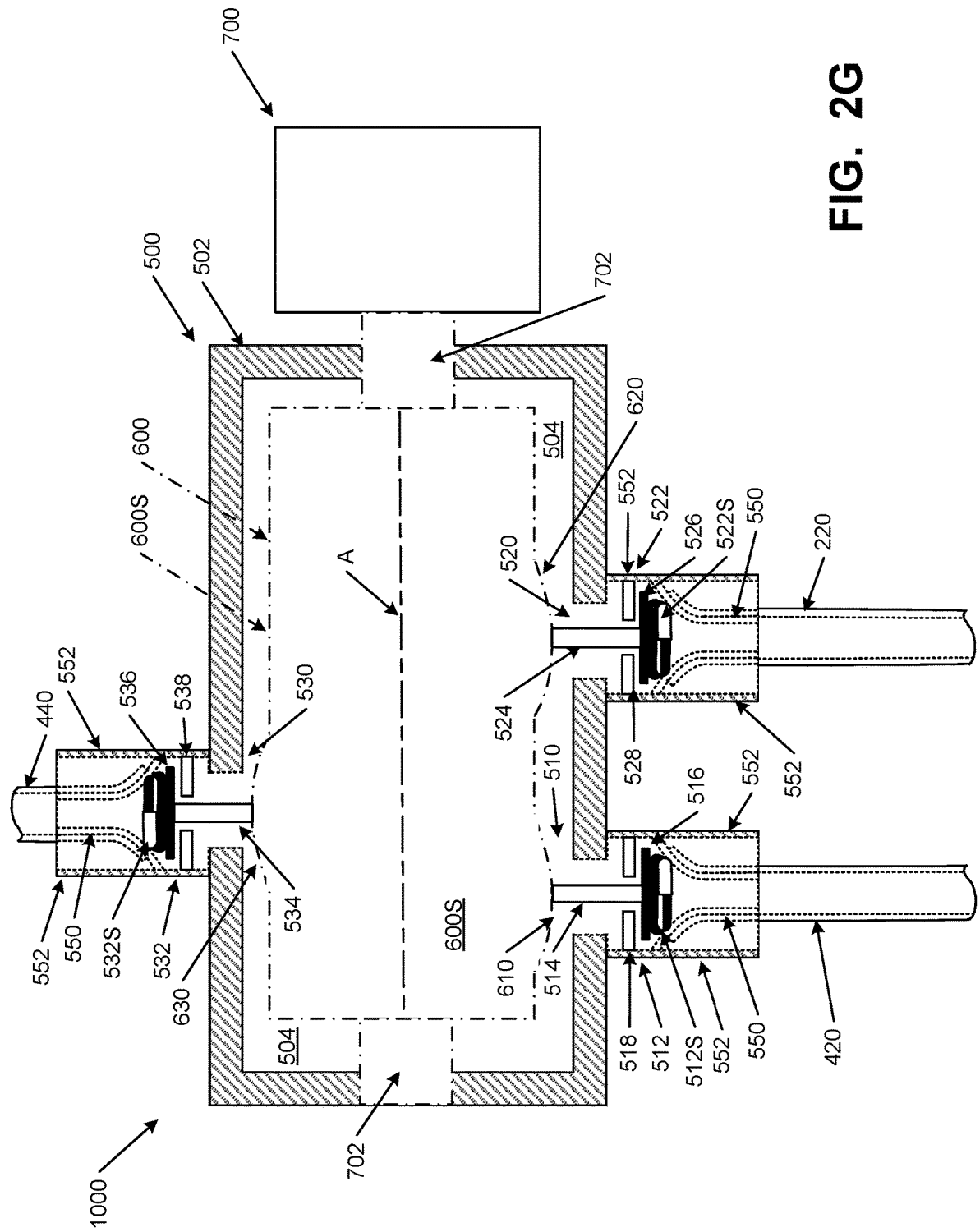

Another operational state of this example fluid flow control system 1000 is shown in FIG. 2G—an "all open" state. This operational state corresponds to at least one distinct position of the movable cam 600 with respect to the manifold body 502 (and/or its ports 510, 520, 530, and/or its valves 512, 522, 532, and/or its valve activators 514, 524, 534). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) at least one of the one or more first valve activator surfaces 610 interacts with the first valve activator 514 to thereby place the first valve 512 in the open configuration, (b) at least one of the one or more second valve activator surfaces 620 interacts with the second valve activator 524 to thereby place the second valve 522 in the open configuration, and (c) at least one of the one or more third valve activator surfaces 630 interacts with the third valve activator 534 to thereby place the third valve 532 in the open configuration. As shown in FIG. 2G, in this operational state: (a) the raised surface 600S of the movable cam 600 at first valve activator surface 610 pushes and moves the first valve activator 514 (downward, in the arrangement of FIG. 2G) to compress spring 512S, (b) the raised surface 600S of the movable cam 600 at second valve activator surface 620 pushes and moves the second valve activator 524 (downward, in the arrangement of FIG. 2G) to compress spring 522S, and (c) the raised surface 600S of the movable cam 600 at third valve activator surface 630 pushes and moves the third valve activator 534 (upward, in the arrangement of FIG. 2G) to compress spring 532S. This action: (a) unseats first valve closure part 516 from the first valve seat 518, opens the first valve 512, and allows fluid to flow through the first valve 512 and first port 510, (b) unseats second valve closure part 526 from the second valve seat 528, opens the second valve 522, and allows fluid to flow through the second valve 522 and second port 510, and (c) unseats third valve closure part 536 from the third valve seat 538, opens the third valve 532, and allows fluid to flow through the third valve 532 and third port 530. This operational state may be used, for example, to equalize fluid pressure over the overall fluid flow control system 1000 (e.g., change all pressures to atmospheric pressure in the fluid source 400 and foot support component 200). This state may be referred to as "a fluid pressure equalizing configuration." It may be used, for example, after a predetermined time period of non-use of the shoe 100 (e.g., in an automatic "power down" configuration)

While the example structures and configurations shown in FIGS. 2A-2G illustrate a movable cam 600 that is rotatable by motor 700 to move cam activator surfaces 610, 620, and 630 to various different circumferential locations and to selectively interact with valve activators 514, 524, and 534, respectively, other options are possible. For example, the motor 700 could be configured (e.g., with other structure) to move cam 600 in an axial or longitudinal direction (e.g., along axis A, back and forth along a longitudinal length of the manifold 500). In such a system, the activator surfaces could be shaped and positioned (longitudinally and circumferentially) to selectively open and/or close any individual valve 512, 522, 532 and/or any desired combination of valves 512, 522, 532 based on the longitudinal position of the movable cam 600 with respect to the manifold body 502 (and/or its various parts). Furthermore, while the movable cam 600 of this illustrated example has a circular circumferential cross sectional shape (exclusive of the activator surface(s) 610, 620, 630), other outer perimeter shapes are possible without departing from this technology, including other cylindrical shapes, other transverse cross sectional shapes, etc.

While various operational states and/or configurations are described above in conjunction with FIGS. 2A-2G, a fluid flow control system in accordance with some examples of this technology may be constructed to take on any one or more of these operational states and/or configurations and/or any desired number and/or combination of these operational states and/or configurations. In other words, a fluid flow control system in accordance with some examples of this technology need not be required to have all of the operational states and/or configurations described above in conjunction with FIGS. 2A-2G (e.g., any one or more and/or any combination of the noted operational states and/or configurations may be provided). Additionally or alternatively, fluid flow control systems in accordance with some examples of this technology may take on other operational states and/or configurations not described above, optionally in combination with any one or more of the operational states and/or configurations described above.

Figure 3:
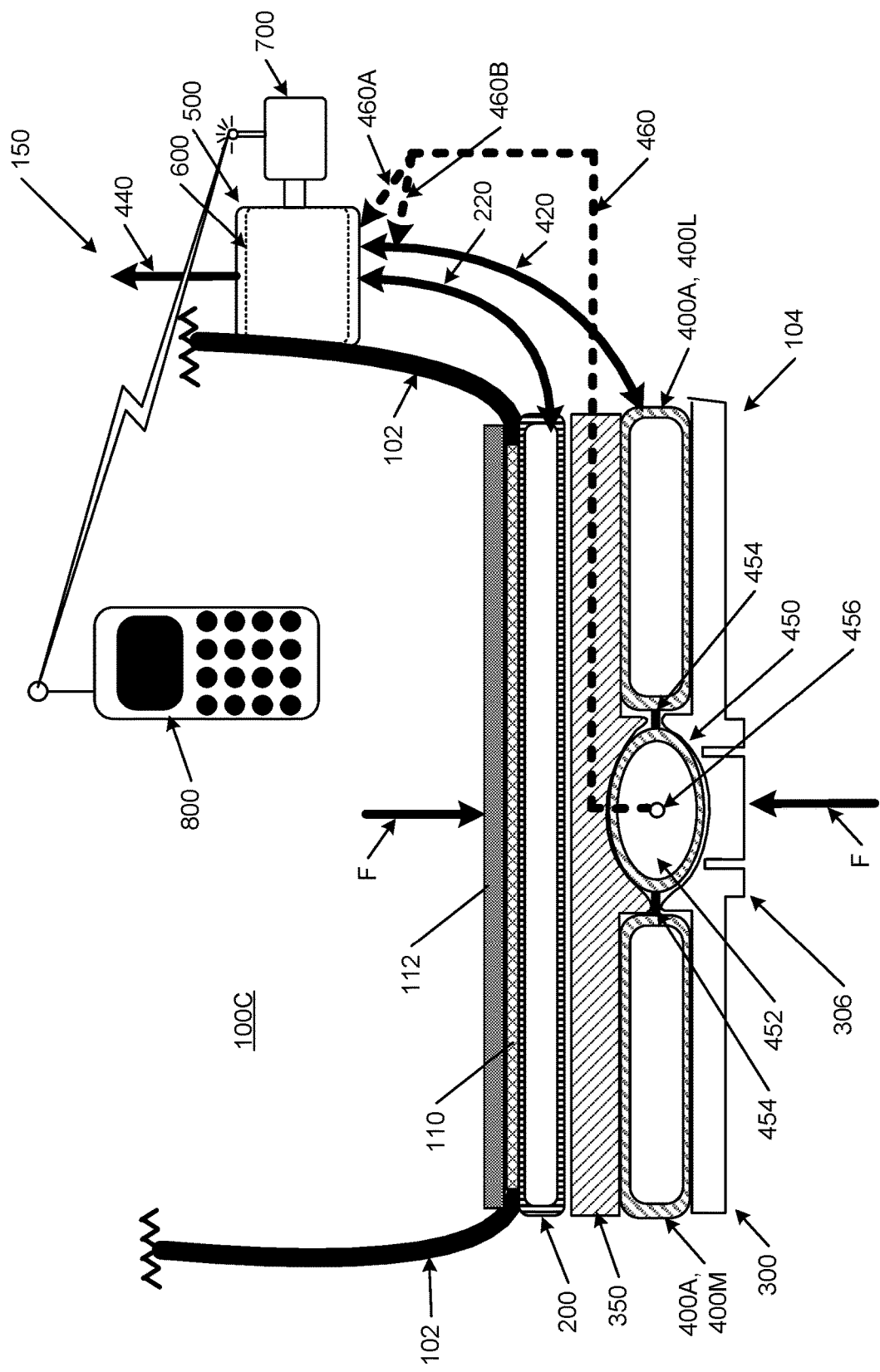
FIG. 3 provides a lateral side-to-medial side and vertical cross sectional view of other example articles of footwear including fluid flow control systems and foot support systems in accordance with some examples of this technology.

FIG. 3 provides a medial side-to-lateral side transverse and vertical cross section of another example footwear 150 structure in accordance with at least some examples of this technology. When the same reference numbers are used in FIG. 3 as used in other figures, the same or similar part is referred to, and this same or similar part may have any of the structures, features, and or options as described above for that part. In the footwear 150 structure of FIG. 3, the fluid source includes a foot-activated pump 450 incorporated into the sole structure 104. This foot-activated pump 450 may constitute a bulb type pump (e.g., with compressible bulb 452) that intakes fluid from the external environment when compressed (see arrows F) between the outsole 300 (at pump activator area 306) and the midsole 350 as the user steps down onto a contact surface. The fluid pushed out of the pump bulb 452 during compression may be transferred to a fluid reservoir (e.g., like reservoirs 400A and/or 400B described above), e.g., via fluid transfer lines 454. A check valve (or other appropriate controller) may be provided in fluid transfer line(s) 454 to prevent fluid from flowing from the fluid reservoir 400A to the pump bulb 452. In this specifically illustrated example, the pump bulb 452 is located between lateral chamber 400L and medial chamber 400M of a sole 104 based fluid reservoir bladder 400A. The lateral chamber 400L and medial chamber 400M may be in open fluid communication with one another (e.g., with free continuous fluid exchange to maintain the chambers 400L, 400M at the same pressure), may be selectively placed in fluid communication with one another (e.g., by a valved fluid transfer line or other connecting structure), or may be isolated from one another (with respect to fluid transfer).

The footwear 150 fluid flow control system of FIG. 3 (e.g., including one or more of manifold 500, movable cam 600, motor 700, input system 800, etc.) may operate in any one or more of the manners described above in conjunction with FIGS. 2A-2G, including any one or more (and/or any combination) of the operational states described above in conjunction with FIGS. 2A-2G. In an example footwear 150 structure like that shown in FIG. 3, the pump 450 construction may be located in any of: a heel area of the sole 104 (to be activated and/or compressed during a heel strike of the foot during a step cycle); a midfoot area of the sole 104 (to be activated and/or compressed as the foot rolls forward during a step cycle); and/or a forefoot area of the sole 104 (to be activated and/or compressed during a toe off phase of a step cycle). A single sole 104 also may include multiple pumps 450 having the same or different structures. When multiple pumps 450 are present, they may be connected in series to one another, individually connected to a fluid reservoir 400A, and/or otherwise incorporated into the footwear 150 and/or fluid flow control system 1000.

In broken lines, however, FIG. 3 further shows one or more additional or alternative fluid transfer lines that may be provided in accordance with at least some examples of this technology. Using one or more of these alternative or additional fluid transfer lines, fluid will move from an outlet 456 of the bulb pump 452 when the bulb pump 452 is compressed, through fluid transfer line 460 (e.g., one or more of plastic tubing, molded in fluid channels, etc.), and to one or more of the manifold 500 (through fluid transfer line branch 460A) and/or the fluid transfer line 420 connected with the fluid reservoir 400A (through fluid transfer line branch 460B). Example structures for these various types of fluid transfers are described in more detail below in conjunction with FIGS. 4-6.

Figure 4:
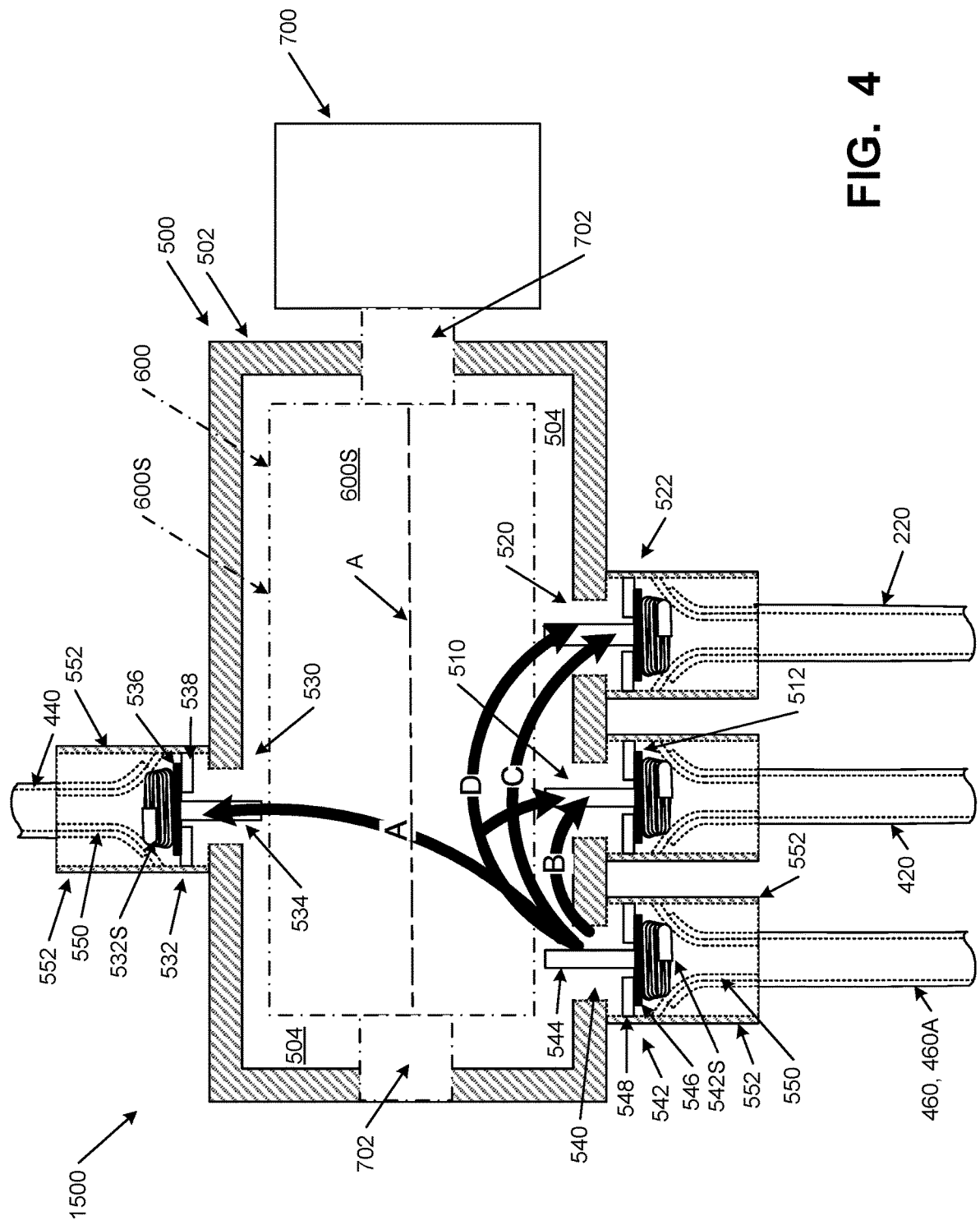

FIG. 4 illustrates an example fluid flow control system 1500 that includes: (a) a first port 510, first valve 512, and the associated structure for activating it, similar to that described above in conjunction with FIGS. 2A-2G; (b) a second port 520, second valve 522, and the associated structure for activating it, similar to that described above in conjunction with FIGS. 2A-2G; (c) a third port 530, third valve 532, and the associated structure for activating it, similar to that described above in conjunction with FIGS. 2A-2G; and (d) a fourth port 540 in fluid communication with the internal chamber 504 of the manifold body 502 and a fourth valve 542 controlling fluid flow through the fourth port 540. For the sake of clarity, not all reference numbers for all structures of the various valves, ports, and activator surfaces are shown in FIG. 4, to avoid obscuring the underlying figure. Refer to FIGS. 2A-2G for more detailed illustration of these parts.

In the example of FIG. 4, the fluid transfer line 460 from the pump 450 includes its own separate port 540 and valve 542 structure to admit fluid from the pump 450 into the internal chamber 504 of the manifold body 502. Although other structures are possible, this illustrated fourth valve 542 includes a biasing spring 542S, a fourth valve activator 544, a fourth valve closure part 546, a fourth valve seating surface 548, a fluid line connector structure 550, and port walls 552 (e.g., as cylindrical structures) in the same or similar structure to ports 510, 520, 530. Further, for this illustrated example, the movable cam 600 includes one or more fourth valve activator surfaces 640 (see FIG. 2B) that can interact with the fourth valve activator 544 to change the fourth valve 542 between a closed configuration and an open configuration when the movable cam 600 is moved to an appropriate position, e.g., in a similar manner as described above for valves 512, 522, 532.

The fluid flow control system 1500 of FIG. 4 can take on several operational configurations, e.g., depending on the relative positioning of the movable cam 600 (and its valve activator surfaces 610, 620, 630, 640) with respect to the valve activators 514, 524, 534, 544. For example, if valve 542 remains closed (e.g., none of one or more activator surfaces 640 of movable cam 600 interacts with valve activator(s) 544 to open valve 542), then fluid flow control system 1500 can take on any of the configurations and positions shown and described above for fluid flow control system 1000 in conjunction with FIGS. 2A and 2C-2G.

Fluid flow arrows A-D in FIG. 4, however, illustrate other potential fluid flow arrangements and configurations that may be activated in the fluid flow control system 1500 of FIG. 4. In the operational state shown by fluid flow arrow A in FIG. 4, the movable cam 600 is located at one distinct position with respect to the manifold body 502 (and/or its ports 510, 520, 530, 540, and/or its valves 512, 522, 532, 542, and/or its valve activators 514, 524, 534, 544) to allow fluid to flow from the pump 450 (via port 540) to the external atmosphere or other destination (via third port 530). In this operational state, movable cam 600 is rotated (via motor 700) to a distinct position so that the one or more first valve activator surfaces 610, the one or more second valve activator surfaces 620, the one or more third valve activator surfaces 630, and the one or more fourth valve activator surfaces 640 are longitudinally (or axially) and circumferentially spaced with respect to one another on the manifold surface 600S (and/or with respect to the manifold body 502, and/or its ports 510, 520, 530, 540, and/or its valves 512, 522, 532, 542, and/or its valve activators 514, 524, 534, 544) such that: (a) none of the one or more first valve activator surfaces 610 interacts with the first valve activator 514 to thereby place the first valve 512 in the closed configuration, (b) none of the one or more second valve activator surfaces 620 interacts with the second valve activator 524 to thereby place the second valve 522 in the closed configuration, (c) at least one of the one or more third valve activator surfaces 630 interacts with the third valve activator 534 to thereby place the third valve 532 in the open configuration, and (d) at least one of the one or more fourth valve activator surfaces 640 interacts with the fourth valve activator 544 to thereby place the fourth valve 542 in the open configuration. In this operational state: (a) the raised surface 600S of the movable cam 600 at third valve activator surface 630 pushes and moves the third valve activator 534 (upward, in the arrangement of FIG. 4) to compress spring 532S, and (b) the raised surface 600S of the movable cam 600 at fourth valve activator surface 640 pushes and moves the fourth valve activator 544 (downward, in the arrangement of FIG. 4) to compress spring 542S. This action: (a) unseats third valve closure part 536 from the third valve seat 538, opens the third valve 532, and allows fluid to flow through the third valve 532 and third port 530, and (b) unseats fourth valve closure part 546 from the fourth valve seat 548, opens the fourth valve 542, and allows fluid to flow through the fourth valve 542 and fourth port 540. With the foot activated pump 450 embodiment of FIG. 3, fluid (e.g., external air) may continuously move into and be displaced by the pump 450 during each step (as bulb pump 452 is compressed). Therefore, this operational state of fluid flow control system 1500 may be used, for example, to continually move fluid from the pump 450 to the external environment (or other destination) when the foot support component 200 is set at a desired foot support pressure (e.g., so that excess fluid pressure does not build up anywhere in the footwear 150 as step count continues and increases). This operational state may be referred to as "a steady stage fluid pressure configuration."

In the operational state shown by fluid flow arrow B in FIG. 4, the movable cam 600 is located at one distinct position with respect to the manifold body 502 (and/or its ports 510, 520, 530, 540, and/or its valves 512, 522, 532, 542, and/or its valve activators 514, 524, 534, 544) to allow fluid to flow from the pump 450 (via port 540) to the fluid reservoir 400 (400A, 400L, 400M) via port 510. In this operational state, movable cam 600 is rotated (via motor 700) to a distinct position so that the one or more first valve activator surfaces 610, the one or more second valve activator surfaces 620, the one or more third valve activator surfaces 630, and the one or more fourth valve activator surfaces 640 are longitudinally (or axially) and circumferentially spaced with respect to one another on the manifold surface 600S (and/or with respect to the manifold body 502, and/or its ports 510, 520, 530, 540, and/or its valves 512, 522, 532, 542, and/or its valve activators 514, 524, 534, 544) such that: (a) at least one of the one or more first valve activator surfaces 610 interacts with the first valve activator 514 to thereby place the first valve 512 in the open configuration, (b) none of the one or more second valve activator surfaces 620 interacts with the second valve activator 524 to thereby place the second valve 522 in the closed configuration, (c) none of the one or more third valve activator surfaces 630 interacts with the third valve activator 534 to thereby place the third valve 532 in the closed configuration, and (d) at least one of the one or more fourth valve activator surfaces 640 interacts with the fourth valve activator 544 to thereby place the fourth valve 542 in the open configuration. In this operational state: (a) the raised surface 600S of the movable cam 600 at first valve activator surface 610 pushes and moves the first valve activator 514 (downward, in the arrangement of FIG. 4) to compress spring 512S, and (b) the raised surface 600S of the movable cam 600 at fourth valve activator surface 640 pushes and moves the fourth valve activator 544 (downward, in the arrangement of FIG. 4) to compress spring 542S. This action: (a) unseats first valve closure part 516 from the first valve seat 518, opens the first valve 512, and allows fluid to flow through the first valve 512 and first port 510, and (b) unseats fourth valve closure part 546 from the fourth valve seat 548, opens the fourth valve 542, and allows fluid to flow through the fourth valve 542 and fourth port 540. This operational state of fluid flow control system 1500 may be used, for example, to increase fluid pressure in the fluid reservoir(s) 400 and thus make fluid available to move into the foot support component 200, when desired by the user. This operational state may be referred to as "a reservoir pressurization configuration."

Optionally, if desired, the pump 450 could be used to directly send fluid to the foot support component 200 (via fluid transfer line 220). This configuration is shown by arrow C in FIG. 4. In the arrow C configuration, the movable cam 600 is located at one distinct position with respect to the manifold body 502 (and/or its ports 510, 520, 530, 540, and/or its valves 512, 522, 532, 542, and/or its valve activators 514, 524, 534, 544) to allow fluid to flow from the pump 450 (via port 540) to the foot support component 200 (via port 522). In this operational state, movable cam 600 is rotated (via motor 700) to a distinct position so that the one or more first valve activator surfaces 610, the one or more second valve activator surfaces 620, the one or more third valve activator surfaces 630, and the one or more fourth valve activator surfaces 640 are longitudinally (or axially) and circumferentially spaced with respect to one another on the manifold surface 600S (and/or with respect to the manifold body 502, and/or its ports 510, 520, 530, 540, and/or its valves 512, 522, 532, 542, and/or its valve activators 514, 524, 534, 544) such that: (a) none of the one or more first valve activator surfaces 610 interacts with the first valve activator 514 to thereby place the first valve 512 in the closed configuration, (b) at least one of the one or more second valve activator surfaces 620 interacts with the second valve activator 524 to thereby place the second valve 522 in the open configuration, (c) none of the one or more third valve activator surfaces 630 interacts with the third valve activator 534 to thereby place the third valve 532 in the closed configuration, and (d) at least one of the one or more fourth valve activator surfaces 640 interacts with the fourth valve activator 544 to thereby place the fourth valve 542 in the open configuration. In this operational state: (a) the raised surface 600S of the movable cam 600 at second valve activator surface 620 pushes and moves the second valve activator 524 (downward, in the arrangement of FIG. 4) to compress spring 522S, and (b) the raised surface 600S of the movable cam 600 at fourth valve activator surface 640 pushes and moves the fourth valve activator 544 (downward, in the arrangement of FIG. 4) to compress spring 542S. This action: (a) unseats second valve closure part 526 from the second valve seat 528, opens the second valve 522, and allows fluid to flow through the second valve 522 and second port 520, and (b) unseats fourth valve closure part 546 from the fourth valve seat 548, opens the fourth valve 542, and allows fluid to flow through the fourth valve 542 and fourth port 540. This operational state of fluid flow control system 1500 may be used, for example, to quickly increase fluid pressure in the foot support component 200 and thus quickly bring the foot support component 200 to a desired foot support pressure (e.g., at an initial pressurization of the foot support component 200, when a large increase in pressure is requested, when the fluid reservoir(s) are not adequately pressurized, etc.). This operational state may be referred to as "a direct foot support pressurization configuration."

As another potential option, as shown by arrow D in FIG. 4, the pump 450 could be used to directly and simultaneously pressurize both the fluid reservoir(s) 400 and the foot support component 200. In the arrow D configuration, the movable cam 600 is located at one distinct position with respect to the manifold body 502 (and/or its ports 510, 520, 530, 540, and/or its valves 512, 522, 532, 542, and/or its valve activators 514, 524, 534, 544) to allow fluid to flow from the pump 450 (via port 540) simultaneously to the foot support component 200 via port 522 and to the fluid reservoir(s) 400 (via port 512). In this operational state, movable cam 600 is rotated (via motor 700) to a distinct position so that the one or more first valve activator surfaces 610, the one or more second valve activator surfaces 620, the one or more third valve activator surfaces 630, and the one or more fourth valve activator surfaces 640 are longitudinally (or axially) and circumferentially spaced with respect to one another on the manifold surface 600S (and/or with respect to the manifold body 502, and/or its ports 510, 520, 530, 540, and/or its valves 512, 522, 532, 542, and/or its valve activators 514, 524, 534, 544) such that: (a) at least one of the one or more first valve activator surfaces 610 interacts with the first valve activator 514 to thereby place the first valve 512 in the open configuration, (b) at least one of the one or more second valve activator surfaces 620 interacts with the second valve activator 524 to thereby place the second valve 522 in the open configuration, (c) none of the one or more third valve activator surfaces 630 interacts with the third valve activator 534 to thereby place the third valve 532 in the closed configuration, and (d) at least one of the one or more fourth valve activator surfaces 640 interacts with the fourth valve activator 544 to thereby place the fourth valve 542 in the open configuration. In this operational state: (a) the raised surface 600S of the movable cam 600 at first valve activator surface 610 pushes and moves the first valve activator 514 (downward, in the arrangement of FIG. 4) to compress spring 512S, (b) the raised surface 600S of the movable cam 600 at second valve activator surface 620 pushes and moves the second valve activator 524 (downward, in the arrangement of FIG. 4) to compress spring 522S, and (c) the raised surface 600S of the movable cam 600 at fourth valve activator surface 640 pushes and moves the fourth valve activator 544 (downward, in the arrangement of FIG. 4) to compress spring 542S. This action: (a) unseats first valve closure part 516 from the first valve seat 518, opens the first valve 512, and allows fluid to flow through the first valve 512 and first port 510, (b) unseats second valve closure part 526 from the second valve seat 528, opens the second valve 522, and allows fluid to flow through the second valve 522 and second port 520, and (c) unseats fourth valve closure part 546 from the fourth valve seat 548, opens the fourth valve 542, and allows fluid to flow through the fourth valve 542 and fourth port 540. This operational state of fluid flow control system 1500 may be used, for example, to quickly increase fluid pressure in both the foot support component 200 and the fluid reservoir(s) 400 and thus quickly bring the entire foot support system to the desired pressures. This operational state may be referred to as "a simultaneous foot support/fluid reservoir pressurization configuration."

As yet another example, the movable cam 600 may include activator surfaces 610, 620, 630, 640 selectively located so that in at least one distinct position with respect to the valve activators 514, 524, 534, 544, all valves 512, 522, 532, 542 and all ports 510, 520, 530, 540 are in an open configuration. This configuration could be used, for example, to equalize fluid pressure over the overall fluid flow control system 1500 (e.g., change all pressures to atmospheric pressure in the fluid source 400, foot support component 200, and manifold 500). This state also may be referred to as "a fluid pressure equalizing configuration," and it could be used, for example, when the shoe 150 is not being actively used (e.g., at power down, when inactive for a predetermined time, etc.).

As another example, the movable cam 600 may include activator surfaces 610, 620, 630, 640 selectively located so that in at least one distinct position with respect to the valve activators 514, 524, 534, 544, all valves 512, 522, 532, 542 and all ports 510, 520, 530, 540 are in a closed configuration. This configuration could be used, for example, to keep the foot support component 200 and fluid reservoir(s) 400 at a set pressure. In such an arrangement, the pump 450 may be deactivated. Alternatively, if pump 450 is activated, the pump 450 may have a fluid line, one-way valve, and/or other appropriate structure (other than manifold 500) to discharge fluid during a pump cycle to the exterior environment or other desired destination.

In at least some examples of this technology, as another option, fluid discharged from manifold 500 via third port 530 and/or fluid moved by the pump 450 when it is not needed by foot support component 200 and/or fluid reservoir(s) 400 may be used in a power harvesting system (e.g., including a turbine, generator, or the like). Such harvested power could be used, for example, to power one or more electronic components in the fluid flow control system 1500, such as motor 700, an input device 800, etc. If desired, with the fluid flow control system 1500 in the configuration shown by arrow A in FIG. 4, the fluid flowing out of manifold 500 through third port 530 could move a small turbine, generator, or other appropriate structure and be used to charge a battery that supplies power to one or more electronic components. Alternatively, with the fluid flow control system 1500 in an "all closed" configuration as mentioned above, fluid discharged by pump 450 could be routed to a power harvesting system, e.g., including a small turbine, generator, or other appropriate structure, and be used to charge a battery that supplies power to one or more electronic components.

While the various operational configurations of the fluid flow control system 1500 of FIG. 4 are described with fluid transfer line 460 connected to a foot activated pump 450, other fluid sources are possible without departing from the technology. For example, fluid transfer line 460 could be connected to a pump that is not foot activated, such as a tongue mounted pump, an upper mounted pump, a small electrical and/or battery operated pump, a manually operated pump, etc. Additionally or alternatively, in some examples of this technology, fluid transfer line 460 could be connected to a compressor or other pressurized fluid source.

Figure 5:
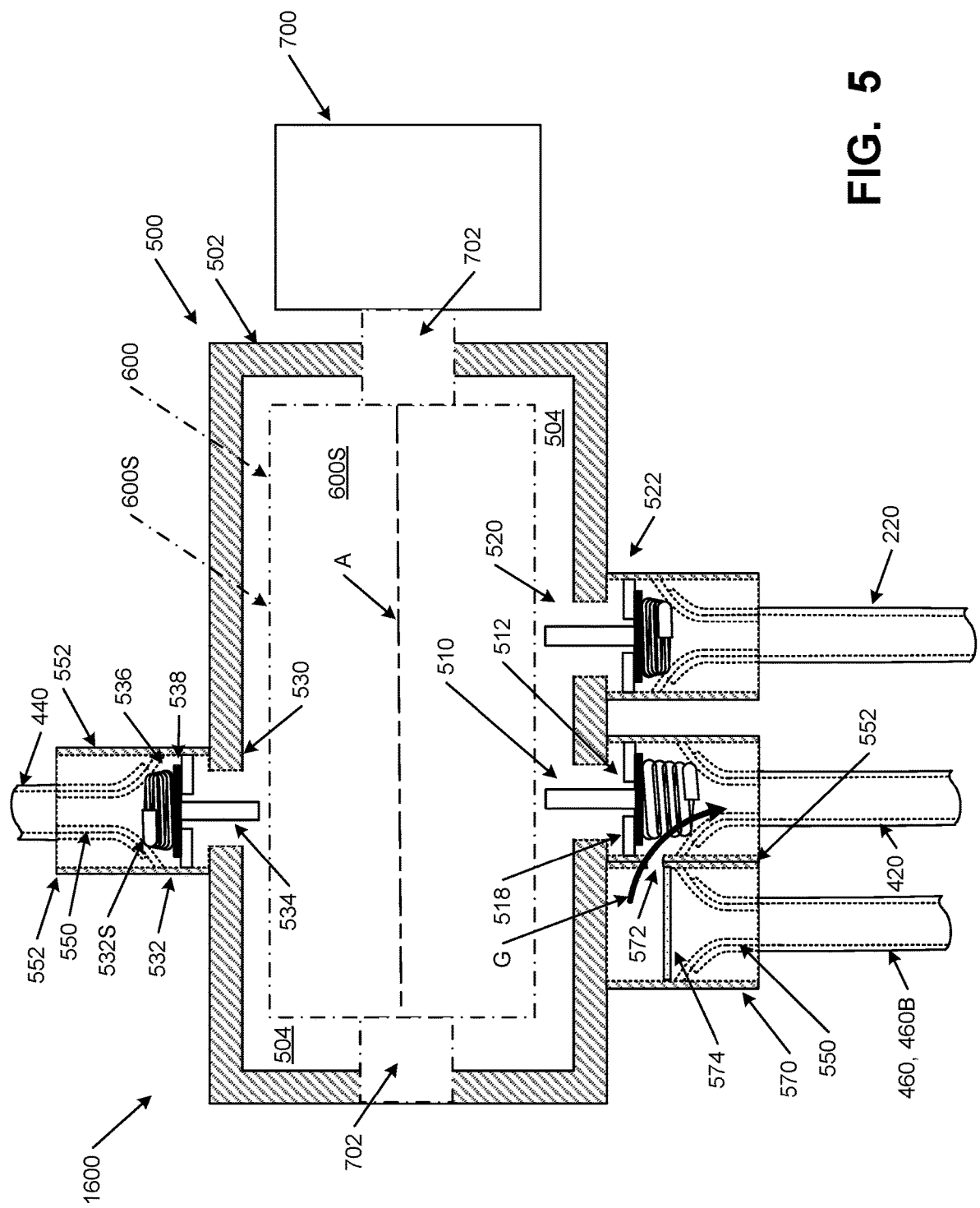

FIG. 5 illustrates another example fluid flow control system 1600 in accordance with at least some examples of this technology. Like the example of FIG. 4, this example fluid flow control system 1600 includes: (a) a first port 510, first valve 512, and the associated structure for activating it, similar to that described above in conjunction with FIGS. 2A-2G; (b) a second port 520, second valve 522, and the associated structure for activating it, similar to that described above in conjunction with FIGS. 2A-2G; and (c) a third port 530, third valve 532, and the associated structure for activating it, similar to that described above in conjunction with FIGS. 2A-2G. For the sake of clarity, not all of the reference numbers for all structures of the various valves, ports, and activator surfaces are shown in FIG. 5, to avoid obscuring the underlying figure. Refer to FIGS. 2A-2G and 4 for more detailed illustration of these parts. In this example fluid flow control system 1600, however, a fourth port 570 is provided in fluid communication with the first port 510, e.g., by an opening 572 defined through a common wall 552 shared by the two ports 510, 570. In this specific example, the opening 572 is located on a side of the valve seat 518 of the first valve 512 located opposite to the internal chamber 504 of the manifold body 502. In this manner, the fourth port 570 is in fluid communication with the first port 510 at a side of the valve seat 518 of the first valve 512 opposite the internal chamber 504 of the manifold 500. The fourth port 570 further may include a one-way valve or check valve 574 (or other appropriate structure) that allows fluid to flow from the fourth port 570 (and pump 450 or other fluid source) into the first port 510 and to the reservoir(s) 400 (via fluid transfer line 420)—see arrow G—while preventing fluid from flowing from the first port 510 and through the fourth port 570 into fluid transfer line 460. Thus, pump 450 will supply fluid to first port 510 and its connected fluid reservoir(s) 400 as long as the pressure in line 460, 460B, e.g., pressure created during a step cycle, is greater than the pressure in line 420 and/or port 510.

The fluid flow control system 1600 of FIG. 5 can be placed in a variety of operational configurations, including in any one or more (and/or any combination) of the operational configurations described above for ports 510, 520, 530 and valves 512, 524, 534 in conjunction with FIGS. 2A-2G. A more detailed explanation will be omitted. As pressure in fluid reservoir(s) 400 increases as a result of continued pumping by pump 450 (e.g., by continued use of a foot-activated pump 450), over-pressure in fluid reservoir(s) 400 can be released or reduced, if needed, e.g., by using the operational configuration of FIG. 2F and/or by a check valve or one-way valve in fluid communication with one or more fluid reservoir 400.

FIG. 6 illustrates still another example fluid flow control system 1700 in accordance with at least some examples of this technology. Like the examples of FIGS. 4 and 5, this example fluid flow control system 1700 includes: (a) a first port 510, first valve 512, and the associated structure for activating it, similar to that described above in conjunction with FIGS. 2A-2G; (b) a second port 520, second valve 522, and the associated structure for activating it, similar to that described above in conjunction with FIGS. 2A-2G; and (c) a third port 530, third valve 532, and the associated structure for activating it, similar to that described above in conjunction with FIGS. 2A-2G. For the sake of clarity, not all of the reference numbers for all structures of the various valves, ports, and activator surfaces are shown in FIG. 6, to avoid obscuring the underlying figure. Refer to FIGS. 2A-2G, 4, and 5 for more detailed illustration of these parts. In this example fluid flow control system 1700, however, a fourth port 580 is provided in fluid communication with the first port 510, e.g., by an opening 582 defined through a common wall 552 shared by the two ports 510, 580. In this specific example, the opening 582 is located on a manifold interior chamber 504 side of the valve seat 518 of the first valve 512. In this manner, the fourth port 580 is in fluid communication with the first port 510 at a side of the valve seat 518 of the first valve 512 opposite the fluid transfer line 420. Further, the fourth port 580 of this example is in direct fluid communication with the internal chamber 504 of the manifold 500. The fourth port 580 further may include a one-way valve or check valve 584 (or other appropriate structure) that allows fluid to flow from the fourth port 580 (and pump 450 or other fluid source) into the internal chamber 504 via the first port 510—see arrows H-K—while preventing fluid from flowing from the first port 510 and/or internal chamber 504 and through the fourth port 580. Thus, pump 450 will supply fluid to the internal chamber 504 of the manifold 500 as long as the pressure in line 460, 460B, e.g., pressure created during a step cycle, is greater than the pressure in the internal chamber 504 of the manifold 500.

The operational states shown by arrows H, I, J, and K in FIG. 6 now will be described in more detail. In the operational state shown by fluid flow arrow H in FIG. 6, the movable cam 600 is located at one distinct position with respect to the manifold body 502 (and/or its ports 510, 520, 530, and/or its valves 512, 522, 532, and/or its valve activators 514, 524, 534) to allow fluid to flow from the pump 450 (via port 580) to the external atmosphere or other desired destination (via third port 530). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) none of the one or more first valve activator surfaces 610 interacts with the first valve activator 514 to thereby place the first valve 512 in the closed configuration, (b) none of the one or more second valve activator surfaces 620 interacts with the second valve activator 524 to thereby place the second valve 522 in the closed configuration, and (c) at least one of the one or more third valve activator surfaces 630 interacts with the third valve activator 534 to thereby place the third valve 532 in the open configuration. In this operational state, the raised surface 600S of the movable cam 600 at third valve activator surface 630 pushes and moves the third valve activator 534 (upward, in the arrangement of FIG. 4) to compress spring 532S. This action unseats third valve closure part 536 from the third valve seat 538, opens the third valve 532, and allows fluid to flow through the third valve 532 and third port 530. With the foot activated pump 450 embodiment of FIG. 3, fluid (e.g., external air) may continuously move into and be displaced by the pump 450 during each step. Therefore, this operational state of fluid flow control system 1700 may be used, for example, to move continually move fluid from the pump 450 to the external environment or other destination (such as a power harvesting system) when the foot support component 200 is set at a desired foot support pressure (e.g., so that excess fluid pressure does not build up anywhere in the footwear 150 as step count continues and increases). This state may be referred to as "a steady stage fluid pressure configuration."

In the operational state shown by fluid flow arrow I in FIG. 6, the movable cam 600 is located at one distinct position with respect to the manifold body 502 (and/or its ports 510, 520, 530, and/or its valves 512, 522, 532, and/or its valve activators 514, 524, 534) to allow fluid to flow from the pump 450 (via port 580) to the fluid reservoir 400 (400A, 400L, 400M) via port 510. In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) at least one of the one or more first valve activator surfaces 610 interacts with the first valve activator 514 to thereby place the first valve 512 in the open configuration, (b) none of the one or more second valve activator surfaces 620 interacts with the second valve activator 524 to thereby place the second valve 522 in the closed configuration, and (c) none of the one or more third valve activator surfaces 630 interacts with the third valve activator 534 to thereby place the third valve 532 in the closed configuration. In this operational state, the raised surface 600S of the movable cam 600 at first valve activator surface 610 pushes and moves the first valve activator 514 (downward, in the arrangement of FIG. 6) to compress spring 512S. This action unseats first valve closure part 516 from the first valve seat 518, opens the first valve 512, and allows fluid to flow through the first valve 512 and first port 510. This operational state of fluid flow control system 1700 may be used, for example, to increase fluid pressure in the fluid reservoir(s) 400 and thus make fluid available to move into the foot support component 200, when desired by the user. This operational state may be referred to as "a reservoir pressurization configuration."

Optionally, if desired, the pump 450 could be used to directly send fluid to the foot support component 200 (via fluid transfer line 220). This configuration is shown by arrow J in FIG. 6. In the arrow J configuration, the movable cam 600 is located at one distinct position with respect to the manifold body 502 (and/or its ports 510, 520, 530, and/or its valves 512, 522, 532, and/or its valve activators 514, 524, 534) to allow fluid to flow from the pump 450 (via port 580) to the foot support component 200 (via port 522). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) none of the one or more first valve activator surfaces 610 interacts with the first valve activator 514 to thereby place the first valve 512 in the closed configuration, (b) at least one of the one or more second valve activator surfaces 620 interacts with the second valve activator 524 to thereby place the second valve 522 in the open configuration, and (c) none of the one or more third valve activator surfaces 630 interacts with the third valve activator 534 to thereby place the third valve 532 in the closed configuration. In this operational state, the raised surface 600S of the movable cam 600 at second valve activator surface 620 pushes and moves the second valve activator 524 (downward, in the arrangement of FIG. 6) to compress spring 522S. This action unseats second valve closure part 526 from the second valve seat 528, opens the second valve 522, and allows fluid to flow through the second valve 522 and second port 520. This operational state of fluid flow control system 1700 may be used, for example, to quickly increase fluid pressure in the foot support component 200 and thus quickly bring the foot support component 200 to a desired foot support pressure (e.g., at an initial pressurization of the foot support component 200, when a large increase in pressure is requested, when the fluid reservoir(s) are not adequately pressurized, etc.). This operational state may be referred to as "a direct foot support pressurization configuration."

As another potential option, as shown by arrow K in FIG. 6, the pump 450 could be used to directly and simultaneously pressurize both the fluid reservoir(s) 400 and the foot support component 200. In the arrow K configuration, the movable cam 600 is located at one distinct position with respect to the manifold body 502 (and/or its ports 510, 520, 530, and/or its valves 512, 522, 532, and/or its valve activators 514, 524, 534) to allow fluid to flow from the pump 450 (via port 580) simultaneously to the foot support component 200 via port 522 and to the fluid reservoir(s) 400 (via port 512). In this operational state, movable cam 600 is rotated (via motor 700) to a distinct position so that the one or more first valve activator surfaces 610, the one or more second valve activator surfaces 620, and the one or more third valve activator surfaces 630 are longitudinally (or axially) and circumferentially spaced with respect to one another on the manifold surface 600S (and/or with respect to the manifold body 502, and/or its ports 510, 520, 530, and/or its valves 512, 522, 532, and/or its valve activators 514, 524, 534) such that: (a) at least one of the one or more first valve activator surfaces 610 interacts with the first valve activator 514 to thereby place the first valve 512 in the open configuration, (b) at least one of the one or more second valve activator surfaces 620 interacts with the second valve activator 524 to thereby place the second valve 522 in the open configuration, and (c) none of the one or more third valve activator surfaces 630 interacts with the third valve activator 534 to thereby place the third valve 532 in the closed configuration. In this operational state: (a) the raised surface 600S of the movable cam 600 at first valve activator surface 610 pushes and moves the first valve activator 514 (downward, in the arrangement of FIG. 6) to compress spring 512S and (b) the raised surface 600S of the movable cam 600 at second valve activator surface 620 pushes and moves the second valve activator 524 (downward, in the arrangement of FIG. 6) to compress spring 522S. This action: (a) unseats first valve closure part 516 from the first valve seat 518, opens the first valve 512, and allows fluid to flow through the first valve 512 and first port 510 and (b) unseats second valve closure part 526 from the second valve seat 528, opens the second valve 522, and allows fluid to flow through the second valve 522 and second port 520. This operational state of fluid flow control system 1700 may be used, for example, to quickly increase fluid pressure in both the foot support component 200 and the fluid reservoir(s) 400 and thus quickly bring the entire foot support system to the desired pressures. This operational state may be referred to as "a simultaneous foot support/fluid reservoir pressurization configuration."

As yet additional examples, the movable cam 600 of the FIG. 5 and/or FIG. 6 examples may include activator surfaces 610, 620, 630 selectively located so that in at least one distinct position with respect to the valve activators 514, 524, 534, all valves 512, 522, 532, and all ports 510, 520, 530 are in an open configuration. These configurations could be used, for example, to equalize fluid pressure over the overall fluid flow control systems 1600 and/or 1700 (e.g., change all pressures to atmospheric pressure in the fluid source 400, foot support component 200, and manifold 500). These states also may be referred to as "a fluid pressure equalizing configuration," and they could be used, for example, during "non-use" times of the shoe 150 (e.g., when the shoe 150 does not move for a predetermined amount of time, at a "power down" time, etc.).

As still additional examples, the movable cam 600 of the FIG. 5 and/or FIG. 6 examples may include activator surfaces 610, 620, 630 selectively located so that in at least one distinct position with respect to the valve activators 514, 524, 534, all valves 512, 522, 532 and all ports 510, 520, 530 are in a closed configuration. Such configurations could be used, for example, to keep the foot support component 200 and fluid reservoir(s) 400 at a set pressure. In such arrangements, the pump 450 may be deactivated. Alternatively, if pump 450 is activated, the pump 450 may have a fluid line, one-way valve, and/or other appropriate structure (other than manifold 500) to discharge fluid during a pump cycle to the exterior environment. As other alternatives or options, fluid flow by the continued operation of pump 450 in the structures of FIGS. 5 and/or 6 may be used for power harvesting purposes, e.g., in any of the various manners described above in conjunction with FIG. 4.

While the various operational configurations of the fluid flow control systems 1600 and/or 1700 of FIG. 5 and/or FIG. 6, respectively, are described with fluid transfer line 460 connected to a foot activated pump 450, other fluid sources are possible without departing from the technology. For example, fluid transfer line 460 could be connected to a pump that is not foot activated, such as a tongue mounted pump, an upper mounted pump, a small electrical and/or battery operated pump, a manually operated pump, etc. Additionally or alternatively, in some examples of this technology, fluid transfer line 460 could be connected to a compressor or other pressurized fluid source.

The overall fluid flow control systems (1000, 1500, 1600, 1700) may include one or more pressure sensors for measuring fluid pressure in one or more of foot support component(s) 200, the fluid reservoir(s) 400, the manifold 500, any fluid transfer lines, etc. Data from the pressure sensor(s) may be fed to an electronic controller (e.g., optionally included with input device 800 and/or housed on the shoe 100, 150) that is programmed to control (e.g., automatically control) the motor 700 to position the cam 600 at distinct position(s) to move fluid, as needed, through the manifold 500 (e.g., in the various operational states described above) to set and maintain at least the foot support component 200 and/or the fluid reservoir(s) 400 at desired pressure levels and/or within pressure ranges. User input (e.g., through input device 800) may be received to set and/or change desired foot support pressure levels, and the electronic controller can be activated in response to the user input to move fluid to produce the desired foot support pressure. Such pressure sensors and electronic controllers, as well as electronically activated cam(s), motor(s), and/or valve(s), are generally known in the electronics and electronic control arts.

III. Conclusion

For avoidance of doubt, the present application includes, but is not limited to, the subject-matter described in the following numbered clauses:

Clause 1. A fluid flow control system for an article of footwear, comprising:
  a manifold body defining an internal chamber;
  a first port in fluid communication with the internal chamber;
  a second port in fluid communication with the internal chamber;
  a third port in fluid communication with the internal chamber;
  a first valve controlling fluid flow through the first port, wherein the first valve includes a first valve activator;
  a second valve controlling fluid flow through the second port, wherein the second valve includes a second valve activator;
  a third valve controlling fluid flow through the third port, wherein the third valve includes a third valve activator; and
  a movable cam at least partially located within the internal chamber, wherein the movable cam includes: (a) one or more first valve activator surfaces that interact with the first valve activator to change the first valve between a closed configuration and an open configuration when the movable cam is moved, (b) one or more second valve activator surfaces that interact with the second valve activator to change the second valve between a closed configuration and an open configuration when the movable cam is moved, and (c) one or more third valve activator surfaces that interact with the third valve activator to change the third valve between a closed configuration and an open configuration when the movable cam is moved.

Clause 2. The fluid flow control system according to clause 1, wherein, in at least one position of the movable cam, the one or more first valve activator surfaces, the one or more second valve activator surfaces, and the one or more third valve activator surfaces are longitudinally and circumferentially spaced with respect to one another such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration.

Clause 3. The fluid flow control system according to clause 1 or 2, wherein, in at least one position of the movable cam, the one or more first valve activator surfaces, the one or more second valve activator surfaces, and the one or more third valve activator surfaces are longitudinally and circumferentially spaced with respect to one another such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration.

Clause 4. The fluid flow control system according to any one of clauses 1 to 3, wherein, in at least one position of the movable cam, the one or more first valve activator surfaces, the one or more second valve activator surfaces, and the one or more third valve activator surfaces are longitudinally and circumferentially spaced with respect to one another such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration.

Clause 5. The fluid flow control system according to any one of clauses 1 to 4, wherein, in at least one position of the movable cam, the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration.

Clause 6. The fluid flow control system according to any one of clauses 1 to 5, further comprising: a fourth port in fluid communication with the internal chamber.

Clause 7. The fluid flow control system according to clause 6, further comprising: a fourth valve controlling fluid flow through the fourth port.

Clause 8. The fluid flow control system according to clause 7, wherein the fourth valve includes a fourth valve activator, and wherein the movable cam further includes one or more fourth valve activator surfaces that interact with the fourth valve activator to change the fourth valve between a closed configuration and an open configuration when the movable cam is moved.

Clause 9. The fluid flow control system according to any one of clauses 1 to 5, further comprising: a fourth port in fluid communication with the first port.

Clause 10. The fluid flow control system according to clause 9, wherein the fourth port is in fluid communication with the first port at an internal chamber side of a valve seating surface of the first valve.

Clause 11. The fluid flow control system according to clause 9, wherein the fourth port is in fluid communication with the first port at a side of a valve seating surface of the first valve opposite the internal chamber.

Clause 12. The fluid flow control system according to any one of clauses 1 to 11, further comprising: a motor operatively coupled with the movable cam to move the movable cam to place the one or more first valve activator surfaces, the one or more second valve activator surfaces, and the one or more third valve activator surfaces in a plurality of different positions with respect to the internal chamber of the manifold body.

Clause 13. The fluid flow control system according to any one of clauses 1 to 11, further comprising: a motor operatively coupled with the movable cam to rotate the movable cam to place the one or more first valve activator surfaces, the one or more second valve activator surfaces, and the one or more third valve activator surfaces in a plurality of different rotational positions with respect to the internal chamber of the manifold body.

Clause 14. A sole structure for an article of footwear, comprising:
 a fluid flow control system according to any one of clauses 1 to 13;
 a fluid container in fluid communication with the first port; and
 a foot support member in fluid communication with the second port.

Clause 15. An article of footwear, comprising:
 a fluid flow control system according to any one of clauses 1 to 13;
 a fluid container in fluid communication with the first port;
 a sole structure including a foot support member in fluid communication with the second port; and
 an upper engaged with the sole structure.

Clause 16. The article of footwear according to clause 15, wherein the manifold body is engaged with the upper.

Clause 17. The article of footwear according to clause 15 or clause 16, wherein the fluid container is engaged with at least one of the upper and the sole structure.

Clause 18. A footwear foot support system, comprising:
 a foot support bladder;
 a fluid source container;
 a manifold body defining an internal chamber;
 a first port placing the fluid source container in fluid communication with the internal chamber;
 a second port placing the foot support bladder in fluid communication with the internal chamber;
 a third port in fluid communication with the internal chamber and with an external environment;
 a first valve controlling fluid flow between the internal chamber and the fluid source container through the first port, wherein the first valve includes a first valve activator;
 a second valve controlling fluid flow between the internal chamber and the foot support bladder through the second port, wherein the second valve includes a second valve activator;
 a third valve controlling fluid flow between the internal chamber and the external environment through the third port, wherein the third valve includes a third valve activator;

a movable cam at least partially located within the internal chamber, wherein the movable cam includes: (a) one or more first valve activator surfaces that interact with the first valve activator to change the first valve between a closed configuration and an open configuration when the movable cam is moved, (b) one or more second valve activator surfaces that interact with the second valve activator to change the second valve between a closed configuration and an open configuration when the movable cam is moved, and (c) one or more third valve activator surfaces that interact with the third valve activator to change the third valve between a closed configuration and an open configuration when the movable cam is moved.

Clause 19. The footwear foot support system according to clause 18, wherein, in at least one position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration.

Clause 20. The footwear foot support system according to clause 18 or 19, wherein, in at least one position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment.

Clause 21. The footwear foot support system according to any one of clauses 18 to 20, wherein at least one position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another.

Clause 22. The footwear foot support system according to clause 21, wherein in the foot support/external environment fluid exchange configuration, fluid moves from the foot support bladder to the external environment through the internal chamber.

Clause 23. The footwear foot support system according to any one of clauses 18 to 22, wherein at least one position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

Clause 24. The footwear foot support system according to clause 23, wherein in the fluid source/foot support fluid exchange configuration, fluid moves from the fluid source container to the foot support bladder through the internal chamber.

Clause 25. The footwear foot support system according to any one of clauses 18 to 24, wherein at least one position of the movable cam is a fluid source/external environment fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the fluid source container and the external environment in fluid communication with one another.

Clause 26. The footwear foot support system according to clause 25, wherein in the fluid source/external environment fluid exchange configuration, fluid moves from the fluid source container to the external environment through the internal chamber.

Clause 27. The footwear foot support system according to any one of clauses 18 to 26, further comprising: a motor operatively coupled with the movable cam to move the movable cam to place the one or more first valve activator surfaces, the one or more second valve activator surfaces, and the one or more third valve activator surfaces in a plurality of different positions with respect to the internal chamber of the manifold body.

Clause 28. The footwear foot support system according to any one of clauses 18 to 26, further comprising: a motor operatively coupled with the movable cam to rotate the movable cam to place the one or more first valve activator surfaces, the one or more second valve activator surfaces, and the one or more third valve activator surfaces in a plurality of different rotational positions with respect to the internal chamber of the manifold body.

Clause 29. The footwear foot support system according to any one of clauses 18 to 28, wherein the fluid source container includes a pump.

Clause 30. The footwear foot support system according to clause 29, wherein the pump includes a foot-activated pump.

Clause 31. The footwear foot support system according to clause 30, wherein the foot-activated pump is located in a forefoot region or in a heel region of the footwear foot support system.

Clause 32. The footwear foot support system according to any one of clauses 18 to 28, wherein the fluid source container includes at least one pump.

Clause 33. The footwear foot support system according to any one of clauses 18 to 28, wherein the fluid source container includes at least one foot-activated pump.

Clause 34. The footwear foot support system according to any one of clauses 18 to 28, wherein the fluid source container includes a compressor.

Clause 35. The footwear foot support system according to any one of clauses 18 to 28, wherein the fluid source container includes a fluid filled reservoir for containing a gas.

Clause 36. The footwear foot support system according to clause 35, wherein the fluid filled reservoir includes a fluid filled bladder.

Clause 37. The footwear foot support system according to clause 35 or 36, further comprising a compressor for supplying fluid at least to the fluid filled reservoir.

Clause 38. The footwear foot support system according to clause 37, further comprising: a fourth port in fluid communication with the first port, wherein fluid from the compressor is supplied to the fluid filled reservoir through the fourth port and the first port without passing through the internal chamber.

Clause 39. The footwear foot support system according to clause 35 or 36, further comprising at least one pump for supplying fluid at least to the fluid filled reservoir.

Clause 40. The footwear foot support system according to clause 39, wherein the at least one pump includes at least one foot-activated pump.

Clause 41. The footwear foot support system according to clause 39 or 40, further comprising: a fourth port in fluid communication with the first port, wherein fluid from the pump is supplied to the fluid filled reservoir through the fourth port and the first port without passing through the internal chamber.

Clause 42. The footwear foot support system according to clause 18, 35, or 36, further comprising: a fourth port in fluid communication with the first port.

Clause 43. The footwear foot support system according to clause 42, wherein the fourth port is in fluid communication with the first port at an internal chamber side of a valve seating surface of the first valve.

Clause 44. The footwear foot support system according to clause 42, wherein the fourth port is in fluid communication with the first port at a side of a valve seating surface of the first valve opposite the internal chamber.

Clause 45. The footwear foot support system according to any one of clauses 18 to 37, further comprising: a fourth port in fluid communication with the internal chamber.

Clause 46. The footwear foot support system according to clause 45, further comprising: a fourth valve controlling fluid flow between the internal chamber and the fourth port.

Clause 47. The footwear foot support system according to clause 46, wherein the fourth valve includes a fourth valve activator, and wherein the movable cam further includes one or more fourth valve activator surfaces that interact with the fourth valve activator to change the fourth valve between a closed configuration and an open configuration when the movable cam is moved.

Clause 48. An article of footwear, comprising: (a) an upper; and (b) a footwear foot support system according to any one of clauses 18 to 47 engaged with the upper.

Clause 49. The article of footwear according to clause 48, wherein at least a portion of the manifold body is engaged with the upper.

Clause 50. The article of footwear according to clause 48 or 49, wherein the footwear foot support system is included as at least a portion of a midsole component.

Clause 51. The article of footwear according to any one of clauses 48 to 50, wherein the footwear foot support system is included as at least a portion of a footwear sole structure.

Clause 52. A fluid flow control system for an article of footwear, comprising:
 a manifold body defining an internal chamber;
 a first port in fluid communication with the internal chamber;
 a first valve controlling fluid flow through the first port, wherein the first valve includes a first valve activator; and
 a movable cam at least partially located within the internal chamber, wherein the movable cam includes one or more first valve activator surfaces that interact with the first valve activator to change the first valve between a closed configuration and an open configuration.

Clause 53. The fluid flow control system according to clause 52, further comprising:
 a second port in fluid communication with the internal chamber; and
 a second valve controlling fluid flow through the second port, wherein the second valve includes a second valve activator;
wherein the movable cam further includes one or more second valve activator surfaces that interact with the second valve activator to change the second valve between a closed configuration and an open configuration.

Clause 54. The fluid flow control system according to clause 52 or 53, further comprising:
 a motor operatively coupled with the movable cam to move (e.g., rotate) the movable cam to place the valve activator surface(s) in a plurality of different positions with respect to the internal chamber of the manifold body.

Clause 55. A footwear foot support system, comprising:
 a foot support bladder;
 a fluid source container;
 a manifold body defining an internal chamber;
 a first port in fluid communication with the internal chamber;
 a first valve controlling fluid flow through the first port, wherein the first valve includes a first valve activator; and
 a movable cam at least partially located within the internal chamber, wherein the movable cam includes one or more first valve activator surfaces that interact with the first valve activator to change the first valve between a closed configuration and an open configuration and to move fluid between the foot support bladder and the fluid source.

Clause 56. The footwear foot support system according to clause 55, wherein the first port places the fluid source container in fluid communication with the internal chamber.

Clause 57. The footwear foot support system according to clause 55, wherein the first port places the foot support bladder in fluid communication with the internal chamber.

Clause 58. The footwear foot support system according to clause 55, wherein the first port places the fluid source container in fluid communication with the internal chamber, and wherein the footwear foot support system further comprises:
- a second port in fluid communication with the foot support bladder and the internal chamber; and
- a second valve controlling fluid flow through the second port, wherein the second valve includes a second valve activator;

wherein the movable cam further includes one or more second valve activator surfaces that interact with the second valve activator to change the second valve between a closed configuration and an open configuration.

Clause 59. The footwear foot support system according to any one of clauses 55 to 58, further comprising: a motor operatively coupled with the movable cam to move (e.g., rotate) the movable cam to place the valve activator surface(s) in a plurality of different positions with respect to the internal chamber of the manifold body.

Clause 60. The footwear foot support system according to any one of clauses 55 to 59, wherein the fluid source container includes one or more of: (a) at least one pump, optionally foot-activated pump(s) (e.g., located in a forefoot region and/or in a heel region of the footwear foot support system), (b) a compressor, (c) a fluid filled reservoir for containing a gas, and/or (d) a fluid filled bladder.

Clause 61. An article of footwear, comprising: (a) an upper; and (b) a footwear foot support system according to any one of clauses 55 to 60 engaged with the upper.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

What is claimed is:

1. A footwear foot support system, comprising:
- a foot support bladder;
- a fluid source container;
- a manifold body defining an internal chamber;
- a first port placing the fluid source container in fluid communication with the internal chamber;
- a second port placing the foot support bladder in fluid communication with the internal chamber;
- a third port in fluid communication with the internal chamber and with an external environment;
- a first valve controlling fluid flow between the internal chamber and the fluid source container through the first port, wherein the first valve includes a first valve activator;
- a second valve controlling fluid flow between the internal chamber and the foot support bladder through the second port, wherein the second valve includes a second valve activator;
- a third valve controlling fluid flow between the internal chamber and the external environment through the third port, wherein the third valve includes a third valve activator;
- a movable cam at least partially located within the internal chamber, wherein the movable cam includes: (a) one or more first valve activator surfaces that interact with the first valve activator to change the first valve between a closed configuration and an open configuration when the movable cam is moved, (b) one or more second valve activator surfaces that interact with the second valve activator to change the second valve between a closed configuration and an open configuration when the movable cam is moved, and (c) one or more third valve activator surfaces that interact with the third valve activator to change the third valve between a closed configuration and an open configuration when the movable cam is moved.

2. The footwear foot support system according to claim 1, wherein, in at least one position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration.

3. The footwear foot support system according to claim 1, wherein, in at least one position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment.

4. The footwear foot support system according to claim 1, wherein at least one position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another.

5. The footwear foot support system according to claim 1, wherein at least one position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

6. The footwear foot support system according to claim 1, wherein at least one position of the movable cam is a fluid source/external environment fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the fluid source container and the external environment in fluid communication with one another.

7. The footwear foot support system according to claim 1, further comprising:
a motor operatively coupled with the movable cam to rotate or otherwise move the movable cam to place the one or more first valve activator surfaces, the one or more second valve activator surfaces, and the one or more third valve activator surfaces in a plurality of different positions with respect to the internal chamber of the manifold body.

8. The footwear foot support system according to claim 1, wherein the fluid source container includes at least one of: a compressor, a fluid filled reservoir for containing gas, or a fluid filled bladder.

9. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration; and
wherein in a second position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment.

10. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration; and
wherein a second position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another.

11. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration; and wherein a second position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

12. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration;

wherein in a second position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment; and wherein a third position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another.

13. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration;

wherein in a second position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment; and wherein a third position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

14. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) none of the one or more third valve activator surfaces interacts with the third valve activator to thereby place the third valve in the closed configuration;

wherein in a second position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment;

wherein a third position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another; and wherein a fourth position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

15. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment; and wherein a second position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another.

16. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment; and wherein a second position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

17. The footwear foot support system according to claim 1, wherein in a first position of the movable cam, the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) none of the one or more second valve activator surfaces interacts with the second valve activator to thereby place the second valve in the closed configuration, and (c) at least one of the one or more third valve activator surfaces interacts with the third valve activator to thereby place the third valve in the open configuration and to thereby place the internal chamber of the manifold body in fluid communication with the external environment;

wherein a second position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another; and wherein a third position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

18. The footwear foot support system according to claim 1, wherein a first position of the movable cam is a foot support/external environment fluid exchange configuration in which the one or more first valve activator surfaces, the one or more second valve activator surfaces, and the one or more third valve activator surfaces are longitudinally and circumferentially spaced with respect to one another and with respect to the first valve activator, the second valve activator, and the third valve activator such that: (a) none of the one or more first valve activator surfaces interacts with the first valve activator to thereby place the first valve in the closed configuration, (b) at least one of the one or more second valve activator surfaces interacts with the second valve activator to thereby place the second valve in the open configuration, and (c) at least one of the one or more third valve activator surfaces interacts with the third valve activator to thereby place the third valve in the open configuration and to thereby place the foot support bladder and the external environment in fluid communication with one another; and wherein a second position of the movable cam is a fluid source/foot support fluid exchange configuration in which the one or more first valve activator surfaces, the one or more second valve activator surfaces, and the one or more third valve activator surfaces are longitudinally and circumferentially spaced with respect to one another such that: (a) at least one of the one or more first valve activator surfaces interacts with the first valve activator to thereby place the first valve in the open configuration, (b) at least one of the one or more second valve activator surfaces interacts with the second valve activator to thereby place the second valve in the open configuration, and (c) none of the one or more third valve activator surfaces interacts with the third valve activator to thereby place the third valve in the closed configuration and to thereby place the fluid source container and the foot support bladder in fluid communication with one another.

19. The footwear foot support system according to claim 1, further comprising:
a fourth port in direct fluid communication with the first port through an opening provided in a sidewall of the first port.

20. The footwear foot support system according to claim 19, wherein the fourth port is in fluid communication with the first port at one of: (a) an internal chamber side of a valve seating surface of the first valve or (b) a side of a valve seating surface of the first valve opposite the internal chamber.

21. The footwear foot support system according to claim 1, further comprising:
a fourth port in fluid communication with the internal chamber.

22. The footwear foot support system according to claim 21, further comprising:
a fourth valve controlling fluid flow between the internal chamber and the fourth port, wherein the fourth valve includes a fourth valve activator, and wherein the movable cam further includes one or more fourth valve activator surfaces that interact with the fourth valve activator to change the fourth valve between a closed configuration and an open configuration when the movable cam is moved.

* * * * *